United States Patent
Hiroi et al.

(10) Patent No.: US 7,269,280 B2
(45) Date of Patent: Sep. 11, 2007

(54) METHOD AND ITS APPARATUS FOR INSPECTING A PATTERN

(75) Inventors: Takashi Hiroi, Yokohama (JP); Masahiro Watanabe, Yokohama (JP); Maki Tanaka, Yokohama (JP); Asahiro Kuni, Tokyo (JP); Chie Shishido, Yokohama (JP); Hiroshi Miyai, Hitachi (JP); Yasuhiko Nara, Hitachinaka (JP); Mitsunobu Isobe, Machida (JP)

(73) Assignee: Hitachi, Ltd., Tokyo (JP)

( * ) Notice: Subject to any disclaimer, the term of this patent is extended or adjusted under 35 U.S.C. 154(b) by 527 days.

(21) Appl. No.: 10/062,632

(22) Filed: Feb. 5, 2002

(65) Prior Publication Data

US 2003/0007677 A1    Jan. 9, 2003

(30) Foreign Application Priority Data

Jul. 9, 2001    (JP) .............................. 2001-207213

(51) Int. Cl.
    *G06K 9/00*    (2006.01)
(52) U.S. Cl. .................................................... 382/149
(58) Field of Classification Search ................ 382/141, 382/143–153; 348/86, 87, 125, 126; 356/237.1, 356/237.4, 237.5, 237.2; 438/16; 700/95, 700/96, 121; 702/35
    See application file for complete search history.

(56) References Cited

U.S. PATENT DOCUMENTS

| | | | | |
|---|---|---|---|---|
| 4,618,938 | A | * | 10/1986 | Sandland et al. ........... 382/148 |
| 5,801,965 | A | * | 9/1998 | Takagi et al. .................. 702/35 |
| 6,047,083 | A | * | 4/2000 | Mizuno ......................... 382/141 |
| 6,067,153 | A | * | 5/2000 | Mizuno ..................... 356/237.2 |
| 6,438,438 | B1 | * | 8/2002 | Takagi et al. ................ 700/121 |
| 6,542,830 | B1 | * | 4/2003 | Mizuno et al. ................ 702/35 |

FOREIGN PATENT DOCUMENTS

| | | |
|---|---|---|
| JP | 61278706 | 12/1986 |
| JP | 2146682 | 6/1990 |
| JP | 385742 | 4/1991 |
| JP | 3232250 | 12/1991 |
| JP | 5258703 | 10/1993 |
| JP | 75116 | 1/1995 |
| JP | 8245161 | 9/1996 |
| JP | 9312318 | 12/1997 |
| JP | 11160247 | 6/1999 |

\* cited by examiner

*Primary Examiner*—Vikkram Bali
(74) *Attorney, Agent, or Firm*—Antonelli, Terry, Stout & Kraus, LLP.

(57) ABSTRACT

In a pattern inspecting apparatus, images of places which can be expected to be the same pattern are compared with one another. However, a comparison of images obtained by different stage scans and the occurrence of a place capable of being inspected only once lead to a deterioration in the performance of detecting various error defects and an area incapable of being inspected, respectively. For solving this problem, defects detected in a high sensitivity condition are regarded as defect candidates and a critical threshold value, used as a boundary to detect a smaller value as a defect, of a defect candidate portion is obtained by an image processing circuit or an image of the defect candidate portion is obtained by processing with software. Further, the critical threshold value thus obtained is compared with plural threshold values, thereby permitting plural inspection results to be obtained in a single inspection.

26 Claims, 17 Drawing Sheets

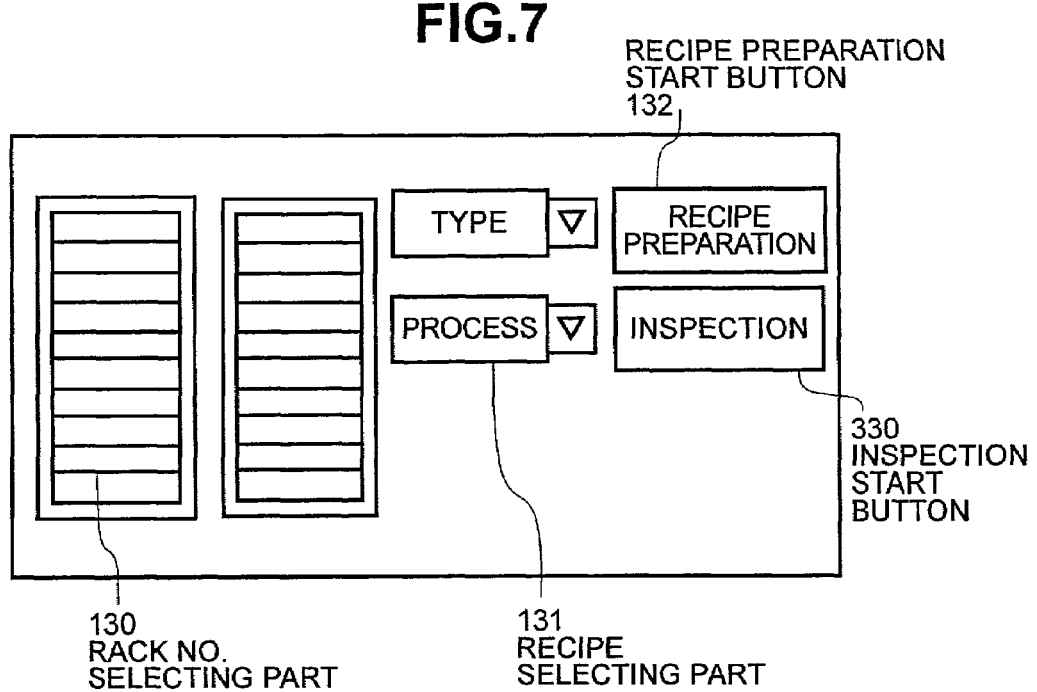
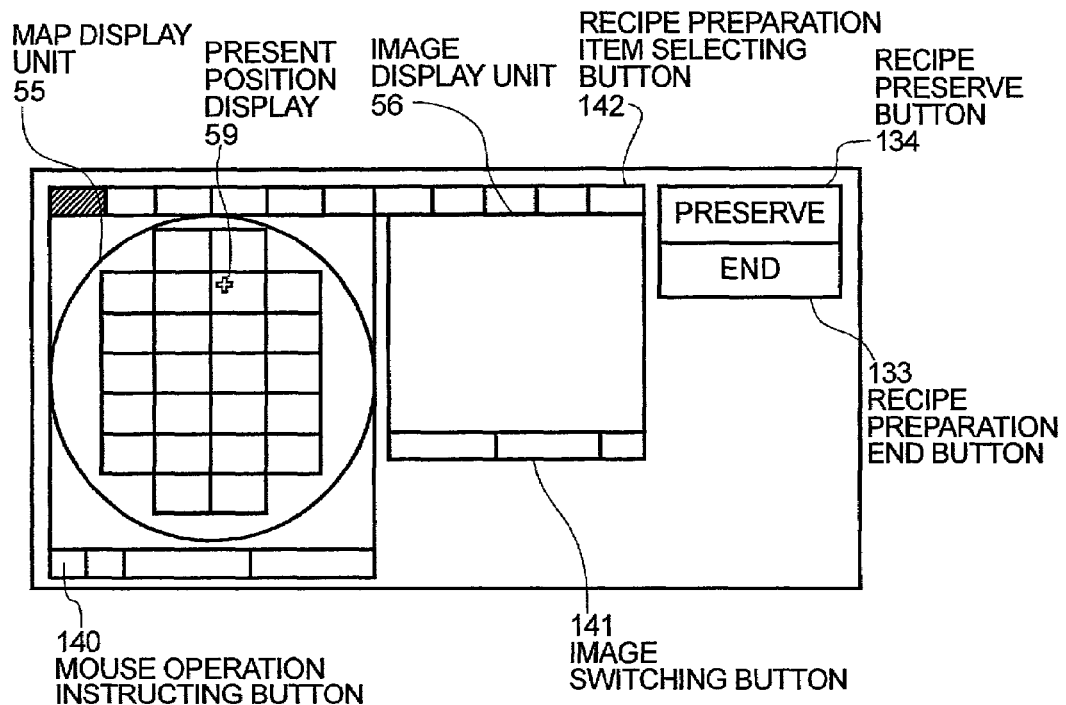

METHOD AND ITS APPARATUS FOR INSPECTING A PATTERN

BACKGROUND OF THE INVENTION

The present invention relates to an apparatus for fabricating a substrate having a circuit pattern of, for example, a semiconductor device or a liquid crystal display. More particularly, the invention is concerned with a technique for inspecting a pattern on a substrate during manufacture.

Conventional electron beam type and optical type pattern inspecting apparatuses are disclosed in JP-A Nos. 258703/1993 and 160247/1999, respectively. More particularly, an example of an electron beam type inspection apparatus is disclosed in the JP-A No. 258703/1993, the construction of which is shown in FIG. 1.

As seen in FIG. 1, an electron beam 2 emitted from an electron beam source 1 is deflected in X the direction by a deflector 3 and is radiated onto an object substrate 5 through an objective lens 4. At the same time, while a Z stage 6 is moved continuously in the Y direction, secondary electrons, etc. from the object substrate 5 are detected by a detector 8, and the resulting detected signal is converted from analog to digital by an A/D converter 9 to provide a digital image. Then, in an image processing circuit 10, the digital image is compared with a digital image of a place on the substrate which is expected to be the same, and then a place giving rise to a difference is detected as a pattern defect, represented by pattern defect data 11, so that a defect position is determined.

An example of an optical type inspection apparatus is disclosed in the JP-A No. 160247/1999, the construction of which is shown in FIG. 2. In the this apparatus, light from a light source 21 is radiated onto an object substrate 5 through an objective lens 22 and reflected light from the substrate is detected by an image sensor 23. The detection is repeated while moving the stage at a constant speed, whereby an image is detected as a detected image data 24, which is then stored in memory 25. The detected image data 24 is then compared with stored image data 27 in the memory 25, which image can be expected to be the same pattern as the detected image. If the detected image is the same pattern, it is regarded as a normal portion, while if it is a different pattern, it is regarded as a pattern defect, represented by pattern defect data 11, and a defect position is determined.

As an example, FIG. 3 shows a layout in a case where the object substrate 5 is a wafer 31. On the wafer 31, there are formed dice 32 which are to be separated when the wafer is finally cut into individual products of the same type. The Z stage 6 is moved along a scanning line 33 to detect an image in a stripe area 34. If a detecting position A now lies at 35, an image 36 at a detecting position B in the memory 25 is taken out as stored image data 27 and is compared with a pattern which can be expected to be the same pattern. The memory 25 has a capacity capable of holding images which can be expected to have the same pattern. By using the memory 25 with a ring-like turn, an actual circuit is constituted.

In the following two examples inspection is performed in such a manner that, in synchronism with pattern detection for an object to be checked for a defect using a binary image, not only is it determined whether a pattern is defective, but also a defect in a specific mask area is ignored.

JP-A No. 278706/1986 discloses an example of inspecting through holes formed in a printed board. There is provided beforehand a printed board with a hole formed only in an area which is an area not to be inspected. An image of the printed board is detected before inspection and is made into a binary hole presence/absence image, thereby detecting whether masking is necessary or not, which image is stored as image data in a masking data storage unit. In the case where a place giving rise to a difference in binary image during inspection corresponds to the image area stored in the masking data storage unit, the difference is ignored and is not inspected thereby.

JP-A No. 5116/1995 discloses an example of inspecting a printed board. A pattern shape is detected and binarized. A normal/abnormal decision is made based on the detected pattern and a check is made to see if the detected pattern lies in a regular pattern. Only when a non-conforming pattern lies in the regular pattern is it judged to be abnormal.

In the following two examples, a dead zone is provided in a pattern boundary portion for the purpose of tolerating an error of the boundary portion in accordance with pattern information.

JP-A No. 146682/1990 discloses an example of inspection in which a mask pattern is compared with design information. A contracted image obtained by contracting a pattern by a certain width and an enlarged image obtained by enlarging the pattern by a certain width, in accordance with design information, are subjected to calculation, and a portion common to both is taken out, thereby providing a dead zone of a certain width. That is, inspection is conducted while setting a mask area so as to ignore an error of a certain width of the pattern boundary portion in accordance with design information.

JP-A No. 312318/1997 discloses an example of inspecting a pattern with use of a scanning electron microscope (hereinafter referred to simply as an "SEM"). In accordance with a reference image obtained beforehand, the vicinity of a pattern image is set as an area not giving rise to a defect because a minute displacement of a pattern edge is not a defect, and an image of an area not giving rise to a critical defect is not acquired. If a difference from the reference image is recognized in an image-acquired area, it is judged to be a defect.

JP-A No. 85742/1991 discloses an example of an apparatus which inspects a pattern on a printed board in a comparative manner. An image of a defect candidate obtained by a comparative inspection is stored in memory and a check is made to see if the defect candidate is a true defect or not asynchronously with inspection and on the basis of the stored image.

In JP-A No. 245161/1996, an object to be inspected, which has plural repetitive patterns, is compared with a candidate portion repeatedly, and when all the comparisons are found to be normal, it is judged that the result of inspection is normal. Comparison and decision are made with respect to N places of images at a time.

In JP-A No. 232250/1991, a simultaneous decision is made for both a cell comparison (repetitive pattern comparison) method for inspecting a portion having a repetition and a die comparison (chip comparison) method for inspecting the whole surface of each die.

For inspection, according to a broad classification, there are two types of requests, one of which is a stable inspection for establishing a statistical sense and the other of which is a high-sensitivity inspection applied in device development. In the former inspection for a statistical sense, for example, wafers in a specific process are checked periodically under the same conditions and the number of defects thereof is managed. This is generally a stable inspection method, which however is carried out in a low-sensitivity condition permitting detection of only relatively large defects. On the other hand, the inspection applied in device development is a high-sensitivity inspection performed for the purpose of detecting all defect modes and even minute defects.

For conducting these two inspections in the conventional inspection apparatus, it has been necessary to change inspecting conditions for the two types of inspections, thus requiring an increased inspection time for plural inspections. Alternatively, it is necessary to provide plural inspection recipes. In the case of a SEM type inspection apparatus, if inspection is conducted plural times, irradiation of the electron beam is carried out plural times, with the result that the state of the object changes due to electron beam irradiation and the inspection is inaccurate in such a changed state of the object. It is not believed that due consideration is given to those problems in the conventional inspection method and apparatus.

Further, the object to be inspected is fabricated in accordance with design information. The density, material and shape of a pattern are determined by design and deviate depending on place. If the pattern density differs, the amplitude in detected signal quantity of a detected pattern differs because there is a limit in the resolution of the inspection system. The same also occurs according to the pattern shape and material. Therefore, even in the case of defects of the same size, if inspection is performed with uniform sensitivity, there arise both a detected place and an undetected place because of different background patterns.

Moreover, even defects of the same size differ in point of whether they can be critical or not. That is, a defect of a place low in pattern density is less critical. Conversely, a place high in pattern density can be a critical defect even if it is a minute defect. Thus, the importance of a defect depends on the pattern density. There also occurs a difference according to material and shape. It is impossible to consider detection sensitivity, defect management and design information separately from one another. It is not considered that the conventional inspection apparatus and method give due consideration to these problems.

As to the optical type and electron beam type pattern inspecting apparatuses disclosed in the foregoing '247 and '703 publications, respectively, these disclosures merely indicate that the whole area is inspected using a single uniform condition for inspection.

According to the techniques disclosed in the foregoing '703 and '247 publications, an area not to be inspected involving a change in inspecting condition is established. In the example disclosed in the '706 publication, it is necessary that an area not to be inspected, which is included in a very large inspection area, should be set in terms of a bit pattern. This corresponds to 7T bits and thus requires a vast number of memories, assuming that an inspection area of 300 mm in diameter is inspected using 0.1 µm pixels in the case of application to wafer inspection. In the '116 publication, it is indicated that an area other than a regular pattern portion is set as an area not to be inspected. However, a wafer pattern for a semiconductor device is constituted by a very complicated pattern, so by utilizing a mere simple regularity, it is impossible to set an area not to be inspected, nor is it possible to obtain plural inspection results in a single inspection.

In the foregoing '682 and '318 publications, it is indicated that an area not to be inspected is set. But since this area not to be inspected, or a non-inspection area, is limited to pattern edges, it is impossible to set a non-inspection area at a required place, nor is it possible to obtain plural inspection results in a single inspection.

In the foregoing '742 publication, a method is described wherein image information of a defect candidate is preserved and an inspection is performed in detail on the basis of the preserved image information to determine whether the defect candidate is a true defect or not. This method can cope with a complicated pattern shape. However, a defect-or-not decision is made in accordance with one uniform criterion, and a portion which is not defective is considered to be a normal portion. That is, as to the portion which is once considered to be a normal portion, information is lost. Besides, plural inspection results cannot be obtained in a single inspection.

The methods described in the foregoing '161 and '250 publications are simultaneous inspection methods for N places, involving comparison with different places, in which results are not obtained under different inspection conditions for one and same place.

SUMMARY OF THE INVENTION

A basic configuration of a pattern inspecting apparatus according to the present invention will now be described. Although the pattern inspecting apparatus about to be described uses an electron beam as a means for picking up an image of a pattern, substantially the same effect can be achieved with an optical pattern inspecting apparatus using light as a means for picking up an image of a pattern.

A first example is shown in FIG. 4. The pattern inspecting apparatus illustrated therein is made up of an electron beam source 1 for emitting an electron beam 2, a deflector 3 for deflecting the electron beam 2, an objective lens 4 for converging the electron beam 2 onto an object substrate 5, a Z stage 6 for holding and scanning or positioning the object substrate 5, a detector 8 for detecting secondary electrons, etc. generated from the object substrate 5, an A/D converter 9 for subjecting a detected signal to A/D conversion to produce a digital image, an image processing circuit 10 which compares the digital image with a digital image of a place that is expected to be the same as the former digital image and which, if there is a difference, detects the difference-generated place as a defect candidate represented by defect candidate data 40, a defect candidate data storage unit 41 which stores feature quantities, such as coordinates, projection length and image information of the defect candidate data 40, and a defect selecting unit 43 which, using the feature quantities of the defect candidate data 40 stored in the defect candidate data storage unit 41 or design information 42, selects a defect candidate corresponding to a defect upon inspection in each of various inspecting conditions and outputs pattern defect data 11.

A description will now be given of a first operation performed in the above-described configuration. The electron beam 2 from the electron beam source 1 is deflected in the X direction by the deflector 3 and is radiated to the object substrate 5 through the objective lens 4. At the same time, while the Z stage 6 is moved continuously in the Y direction, secondary electrons, etc. generated from the object substrate 5 are detected by the detector 8 and the detected signal is subjected to A/D conversion into a digital image in the A/D converter 9. Then, using an image processing condition A 50 (not shown) of high sensitivity, the digital image is compared with a digital image of a place that is expected to be the same as the former digital image in the image processing circuit 10 and a place giving rise to a difference is regarded as a defect candidate represented by defect candidate data 40, then its feature quantities, such as coordinates, projection length and image information, or image data, are stored in the defect candidate data storage unit 41. In the defect selecting unit 43 a check is made to see if the use of an image processing condition B 51 (not shown) of low sensitivity will result in a judgment that there is a difference. If the answer is affirmative, there is added information of a defect being recognized under either of image processing conditions A 50 and B 51. On the other hand, if the answer is negative, there is added information of a defect being recognized in only the image processing condition A 50. The addition of information produces pattern defect data 11. In the pattern defect data 11, there is included information as to whether a judgment of a defect will result or not if inspection is made in the image processing condition B 51. Design information is not used in this operation.

Reference will now be made to a second operation performed in the above-described configuration. The electron beam 2 from the electron beam source 1 is deflected in the X direction by the deflector 3 and is radiated to the object substrate 5 through the objective lens 4. At the same time, while the Z stage 6 is moved continuously in Y the direction, secondary electrons, etc. 7 from the object substrate 5 are detected by the detector 8 and the detected signal is subjected to A/D conversion into a digital image in the A/D converter 9. Then, using an image processing condition A 50 (not shown) of high sensitivity, the digital image is compared with a digital image of a place that is expected to be the same as the former digital image in the image processing circuit 10. A place giving rise to a difference is regarded as a defect candidate represented by defect candidate data 40 and its feature quantities, such as its coordinates, projection length and image information, or image data, are stored in the defect candidate data storage unit 41. In the defect selecting unit 42, it is judged, using design information, whether an image processing condition B51 (not shown) of low sensitivity is to be used or not. In the case where there is a difference and the place in question is judged to be inspected at a low sensitivity in accordance with design information 42, there is added information of a defect being recognized under either of the image processing conditions A 50 and B 51. In the other case, there is added information of a defect being recognized in only the image processing condition A 50. The addition of information provides pattern defect data 11. In the pattern defect data 11, there is included information as to whether a judgment of a defect will result or not if inspection is made under the image processing condition B51.

Although the above description is directed to a case where design information is used, the design information may be replaced by the information stored in the defect candidate data storage unit 41 or by information, such as information indicating a high pattern density, information indicating a large sum total of image differential values, or information indicating a pattern of a specific shape which should be inspected at a low sensitivity. Both the design information 42 and the information stored in the defect candidate data storage unit 41 may be used in combination. For example, there may be adopted a method wherein, using the design information 42, it is judged whether a redundant wiring exists or not, and if dimensional information stored in the defect candidate data storage unit 41 represents a dimension larger than a specific dimension on the redundant wiring, this is judged to be a defect in the image processing condition B 51.

A second example of the basic configuration of a pattern inspecting apparatus according to the present invention is shown in FIG. 5. This pattern inspecting apparatus is composed of an electron beam source 1 for emitting an electron beam 2, a deflector 3 for deflecting the electron beam 2, an objective lens 4 for converging the electron beam 2 onto an object substrate 5, a Z stage 6 for holding and scanning or positioning the object substrate 5, a detector 8 for detecting secondary electrons, etc. generated from the object substrate 5, an A/D converter for subjecting a detected signal to A/D conversion to provide a digital image, an image processing circuit A 46 which compares in a first condition the digital image with a digital image of a place that is expected to be the same as the former digital image and which, if there is a difference, detects the difference-generated place as a defect candidate represented by the defect candidate data A 44 in the first condition, an image processing circuit B 47 which compares in a second condition the digital image resulting from A/D conversion with a digital image of a place that is expected to be the same as the former digital image and which, if there is a difference, detects the difference-generated place as a defect candidate represented by defect candidate data B 49 in the second condition, and a defect selecting/storage unit 48 which selects and stores feature quantities, such as coordinates, projection length and image information of the defect candidates A 44 and B 49 extracted in the inspections under the first and second conditions, respectively.

A first operation performed in this second configuration will now be described. Electron beam 2 from the electron beam source 1 is deflected in the X direction by the deflector 3 and is radiated to the object substrate 5 through the objective lens 4. At the same time, while the Z stage 6 is moved continuously in the Y direction, secondary electrons, etc. 7 from the object substrate 5 are detected by the detector 8 and the detected signal is subjected to A/D conversion into a digital image in the A/D converter 9. Then, in the image processing circuit A 46, this digital image is compared with a digital image of a place that is expected to be the same as the former digital image in the first condition, which is an image processing condition A 50 of high sensitivity. A place giving rise to a difference is regarded as a defect candidate represented by defect candidate data A 44 in the first condition. In the image processing circuit B 47, the digital image is compared with a digital image of a place that is expected to be the same as the former digital image in the second condition, which is an image processing condition of low sensitivity, and a place giving rise to a difference is judged to be a defect candidate represented by defect candidate data B 49 in the second condition. In the defect selecting/storage unit 48, information of a defect being recognized in either of image processing conditions A 50 and B 511s added to information of one having the same coordinates as the defect candidate data B 49 and included in the defect candidate data A 44, whereby there is included information of a defect judgment being made in either of the image processing condition A 50 of high sensitivity and the image processing condition B 51 of low sensitivity. Design information 42 is not used in this operation.

A second operation performed in the second configuration will now be described. The electron beam 2 from the electron beam source 1 is deflected in the X direction by the deflector 3 and is applied to the object substrate 5 through the objective lens 4. At the same time, while the Z stage 6 is moved continuously in the Y direction, secondary electrons, etc. from the object substrate 5 are detected by the detector 8 and the detected signal is subjected to A/D conversion into a digital image in the A/D converter 9. Then, in the image processing circuit A 46, the digital image is compared with a digital image of a place that is expected to be the same as the former digital image in a first condition, which is an image processing condition A 50 of high sensitivity, and a place giving rise to a difference is judged to be a defect candidate represented by defect candidate data B 49 in the second condition.

In the defect selecting/storage unit 48, information of a defect being recognized in either of image processing conditions A 50 and B 51 is added temporarily to information of one having the same coordinates as the defect candidate data B 49 and included in the defect candidate data A 44. In case of a place having been judged to be a place which should be inspected at a low sensitivity in accordance with design information 42, and if there exists the temporarily added information of a defect being recognized in either image processing conditions A 50 and B 51, there is added true information of a defect being recognized in either of image processing conditions A 50 and B 51. In case of the temporary information alone, there is added information of a defect being recognized in only the image processing condition A 50. The addition of information provides pattern detect data 11. In the pattern defect data 11, there is included information as to whether a judgment of a defect will result or not if inspection is made under the image processing conditions A 50 and B 51.

A method may be adopted which does not use design information 42, but uses information stored in the defect selecting/storage unit 48, for example, information indicating a high pattern density, information indicating a large sum total of image differential values, or. information indicating a pattern of a specific shape which should be inspected at a low sensitivity. A method using both design information 42 and information stored in the defect selecting/storage unit 48 also may be adopted. For example, a method may be adopted wherein, using the design information 42, it is judged whether a redundant wiring exists or not, and if dimensional information stored in the defect selecting/storage unit 48 represents a dimension larger than a specific dimension on the redundant wiring, this is judged to be a defect in the image processing condition B 51.

Consequently, using an image obtained by a single image pick-up operation, it is possible to effect inspection under plural inspection conditions. Besides, the image processing sensitivity can be changed using image information during inspection of a place based on design information and a place where a defect exists. It is also possible to effect inspection at a constant sensitivity independently of a pattern. Further, it is possible to inspect defects of the same criticality.

These and other objects, features and advantages of the invention will be apparent from the following more particular description of preferred embodiments of the invention, as illustrated in the accompanying drawings.

BRIEF DESCRIPTION OF THE DRAWINGS

FIG. 7 is a diagram of a display screen, showing an initial display in the first embodiment;

FIG. 8 is a diagram of a display screen, showing a contrast setting screen in recipe preparation in the first embodiment;

DETAILED DESCRIPTION OF THE PREFERRED EMBODIMENTS

Embodiments of the present invention will be described in detail hereinunder with reference to the accompanying drawings.

First Embodiment

Figure 6:
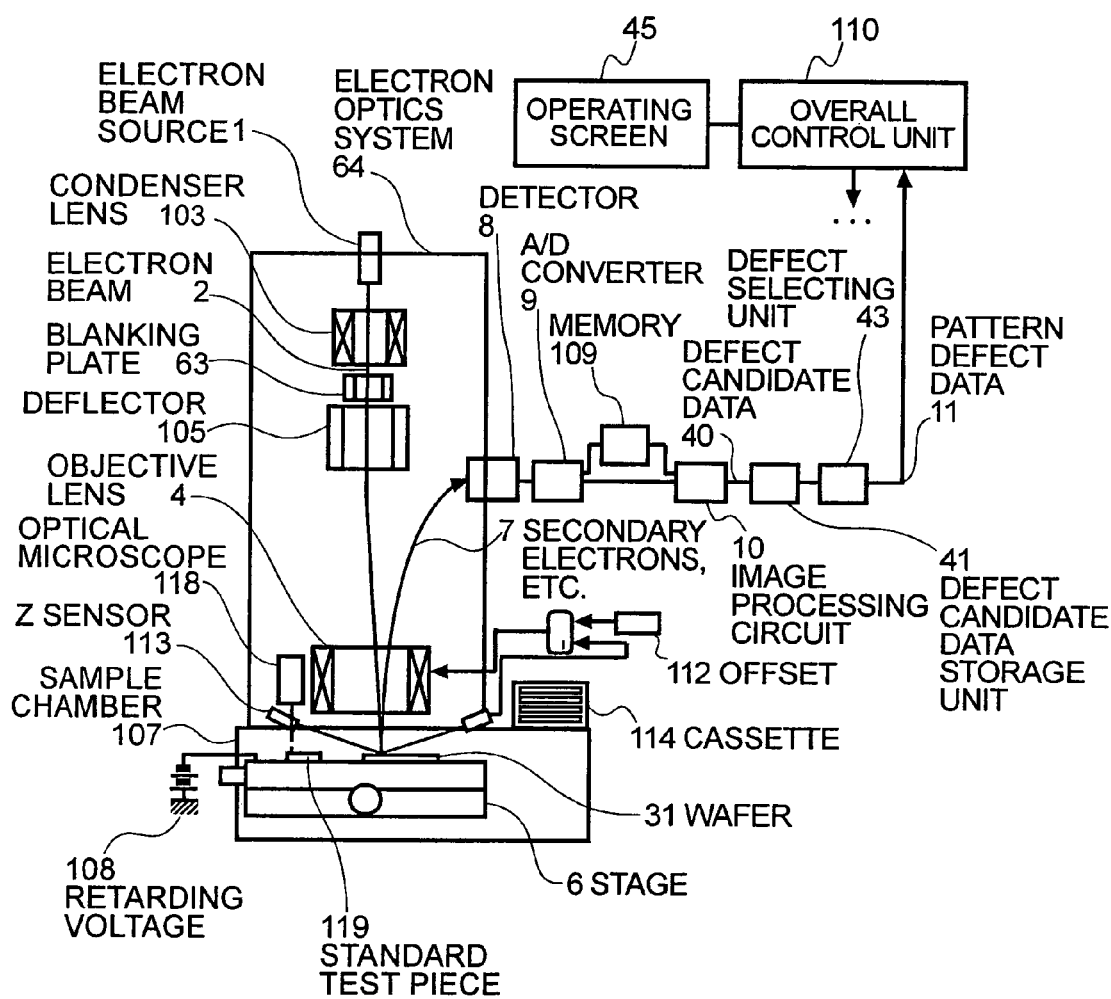
FIG. 6 is a schematic diagram of an electron beam type pattern inspecting apparatus, showing the configuration of a first embodiment of the present invention.

A first embodiment of the present invention will be described with reference to FIG. 6, which illustrates an example of the configuration of an electron beam type pattern inspecting apparatus according to the invention.

The electron beam type pattern inspecting apparatus is composed of an electron beam source 1 having an electron gun for emitting an electron beam 2, and an electron optical system which extracts the electron beam 2 from the electron beam source 1 while accelerating it and which forms a virtual light source at a certain position using an electrostatic or electromagnetic lens. The electron optical system comprises a condenser lens 103 for converging the electron beam 2 from the virtual light source to a certain position, a blanking plate 63 installed near a position where the electron beam is converged by the electron gun to effect ON/OFF of the electron beam 2, a deflector 105 for deflecting the electron beam 2 in XY directions, and an objective lens 4 for converging the electron beam 2 onto an object substrate 5. The apparatus further includes a sample chamber 107 which holds wafer 31 as the object substrate in vacuum, a Z stage 6 with the wafer 31 carried thereon and to which a retarding voltage 108 is applied which permits image detection at an arbitrary position, and a detector 8 for detecting secondary electrons, etc. generated from the object substrate 5.

An A/D converter 9 is provided for subjecting a detected signal received from the detector 8 to A/D conversion to obtain a digital image, and a memory 109 operates to store the digital image. An image processing circuit 10 forms a difference image between the image stored in the memory 109 and the digital image obtained by A/D conversion and detects a place giving rise to a difference as a defect candidate represented by defect candidate data 40. The image processing circuit 10 obtains feature quantities of the detected defect candidate data 40, such as coordinates, projection length, area, critical threshold DD (a threshold value used as a boundary to detect a smaller value as a defect), difference image mean value, difference image dispersion, maximum image difference, defective image texture, reference image texture, and image information, and a defect candidate data storage unit 41 stores the image of the defect candidate data 40 and feature quantities. A defect selecting unit 43 outputs pattern defect data 11 after adding information to the defect candidate data 40 read from the defect candidate data storage unit 41. An overall control unit 110, which controls the entire apparatus, receives the pattern defect data 11 from the defect selecting unit 43 (a control line from the overall control unit 110 is omitted in the figure) and provides data to a display device having an operating screen 52 for various operations, a keyboard and a mouse and a knob for instructing operations (none of them are shown).

A Z sensor 113 measures the height of the wafer 31 and keeps constant a focal position of a digital image detected by controlling the current value of the objective lens 4 with offset 112 added thereto. A loader (not shown) is provided for loading and unloading the wafer 31 present within a cassette 114 with respect to the sample chamber 107, and an orientation flat detector (not shown) positions the wafer 31 on the basis of the external shape of the wafer. An optical microscope 118 is provided for observing a pattern on the wafer 31, and a standard test piece 119 is mounted on the Z stage 6.

The operation of the first embodiment will now be described. The operation involves a conditioning operation for setting a threshold value of N expression and an inspection in which there is outputted pattern defect information with defect-or-not information added to the detected defect candidate data 40 in each threshold value.

The conditioning operation is performed in the following manner. An initial screen as shown in FIG. 7 is displayed on the operating screen 52. By way of the operating screen 52, a user selects a rack No. on which the wafer 31 of concern rests with use of a rack No. selecting part 130, designates the type and process of the wafer 31 of concern with use of a recipe selecting part 131 and pushes a recipe preparation start button 132 to start conditioning. The conditioning operation involves contrast setting for setting conditions for the electron optics system, pattern layout setting for the wafer 31, alignment for pattern positioning on the wafer, calibration for checking the signal quantity at a place where the signal quantity of the wafer 31 is expressed exactly, and image processing condition setting for setting and acknowledging an image processing threshold value. Here, the related contrast setting and image processing condition setting will be described.

Upon start-up of operation, the overall control unit 110 instructs the components to operate in accordance with the following procedure. A command is issued to the loader (not shown), which in turn takes the wafer 31 from the cassette 114. The position of the wafer 31 is established on the basis of its external shape by means of the orientation flat detector (not shown) and is placed on the Z stage 6. The interior of the sample chamber 107 is evacuated. When the wafer 31 is resting on the Z stage 6, conditions are set for both the electron optics system and the retarding voltage 108, and a voltage is applied to the blanking plate 63 to cut OFF the electron beam 2. The stage is moved to align the standard test piece 119, the Z sensor (a wafer height detector) 113 is made valid, the focal point is kept constant at a detected value of the Z sensor 113 plus the offset 112, the deflector 105 is raster-scanned, the voltage of the blanking plate 63 is cut OFF in synchronism with the scan, the electron beam 2 is radiated onto the wafer 31 only when required, reflected electrons or secondary electrons emitted at this instant from the wafer 31 are detected by the detector 8, and the detected signal is converted into a digital image by the A/D converter 9.

Plural digital images are detected by changing the offset 112, and an optimum offset corresponding to the largest intra-image total of image differential values is set as a current offset value in the overall control unit 110 at every detection. After the setting, the Z sensor 113 is made invalid and the screen is shifted to a contrast adjusting screen, as shown in FIG. 8. The contrast adjusting screen is composed of a map display unit 55 provided with a button for controlling a map display method, such as the display of a map and the whole of a wafer or die. The screen is also provided with a mouse operation instructing button 140 for instructing movement to a selected position or selection of an item thereof on being selected by the mouse, and an image display unit 56 that is provided with an image switching button 141, the image switching button 141 designating a portion to be image-displayed, an image magnification and the type of image, such as an optical microscope image obtained in the optical microscope 118 or an SEM image obtained in the electron optical system. The screen also provides a recipe preparation item selecting button 142, a recipe preparation end button 133, and a recipe preserve button 134.

Figure 9:
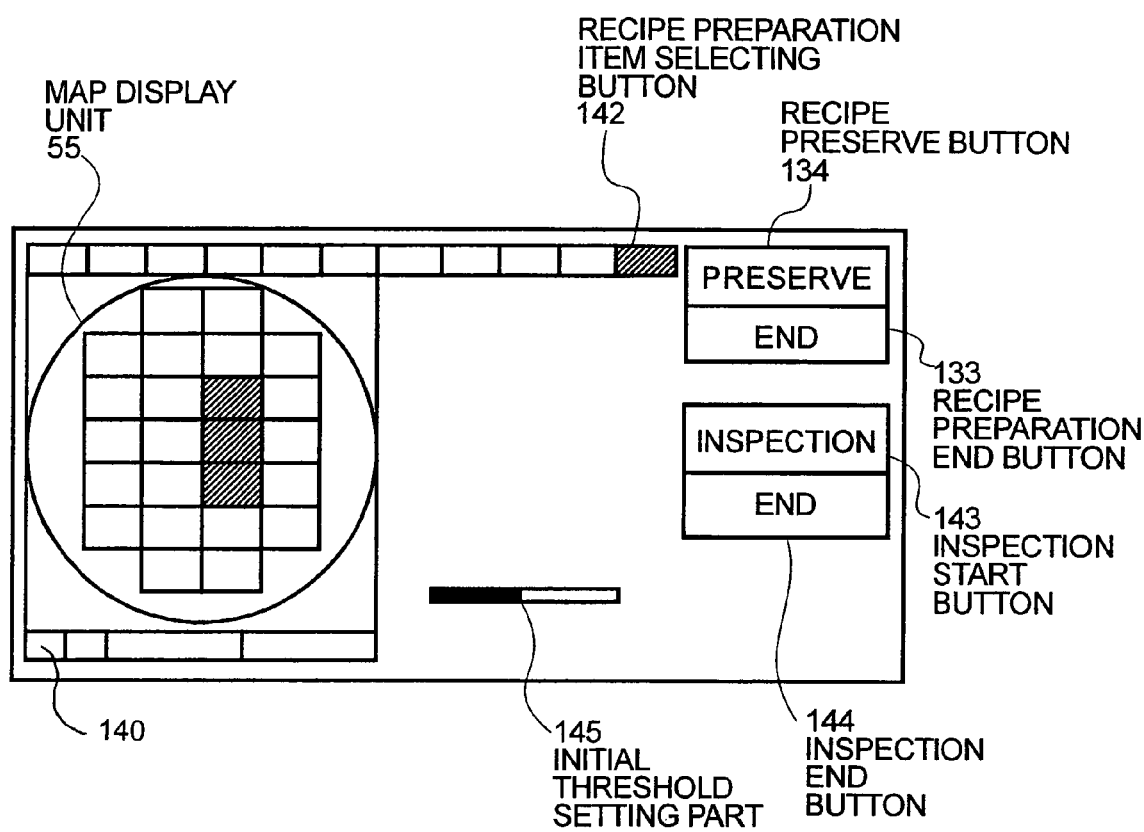
FIG. 9 is a diagram of a display screen, showing an initial screen of a trial inspection in recipe preparation in the first embodiment.

On the contrast adjusting screen, the mouse operation instructing button 140 is set to a movement mode and the mouse 121 is clicked for movement on the map and the image of the place of concern is displayed on the image display unit. An electron optics system adjusting item is allocated to the knob to adjust various components of the electron optics system to thereby provide an appropriate contrast. The recipe preparation end button 133, the recipe preserve button 134, and the recipe preparation item selecting button 142 instruct the end of recipe preparation, preservation of recipe condition, and setting of another condition and screen transition, respectively. These buttons are common to all screens. By switching the recipe preparation item selecting button 142 to an image processing condition setting screen, a transition is made to an image processing condition setting screen, as shown in FIG. 9.

The image processing condition setting screen is composed of the map display unit 55, recipe preparation end button 133, recipe preserve button 134, recipe preparation item selecting button 142, inspection start button 143, inspection end button 144, and initial threshold setting part 145. The mouse operation instructing button 140 is set to a selection mode. When the user clicks a die in the map display unit, a select/non-select switching is effected for the die to be inspected on trial and the die to be inspected is selected. After selection of the die to be inspected and setting of an initial threshold value th0 by the initial threshold setting part 145, the start of trial inspection is instructed by clicking the inspection start button 143. Upon start of the trial inspection, the Z stage 6 is moved to a scanning start position of a to-be-inspected area of the wafer 31 carried on the stage.

Figure 1:
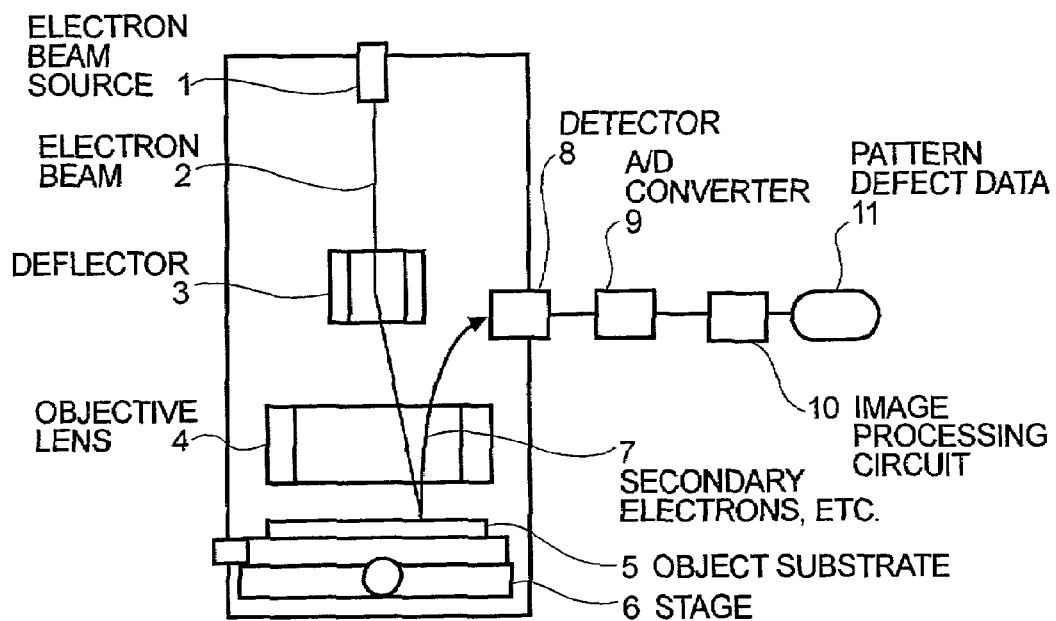
FIG. 1 is a schematic diagram showing the configuration of a conventional electron beam type pattern inspecting apparatus.
Figure 2:
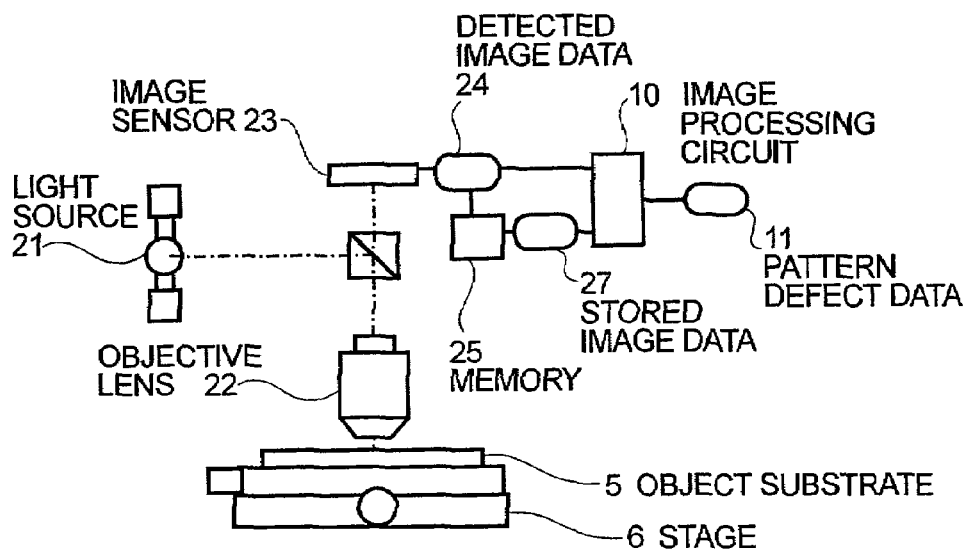
FIG. 2 is a schematic diagram view showing the configuration of a conventional optical pattern inspecting apparatus.
Figure 3:
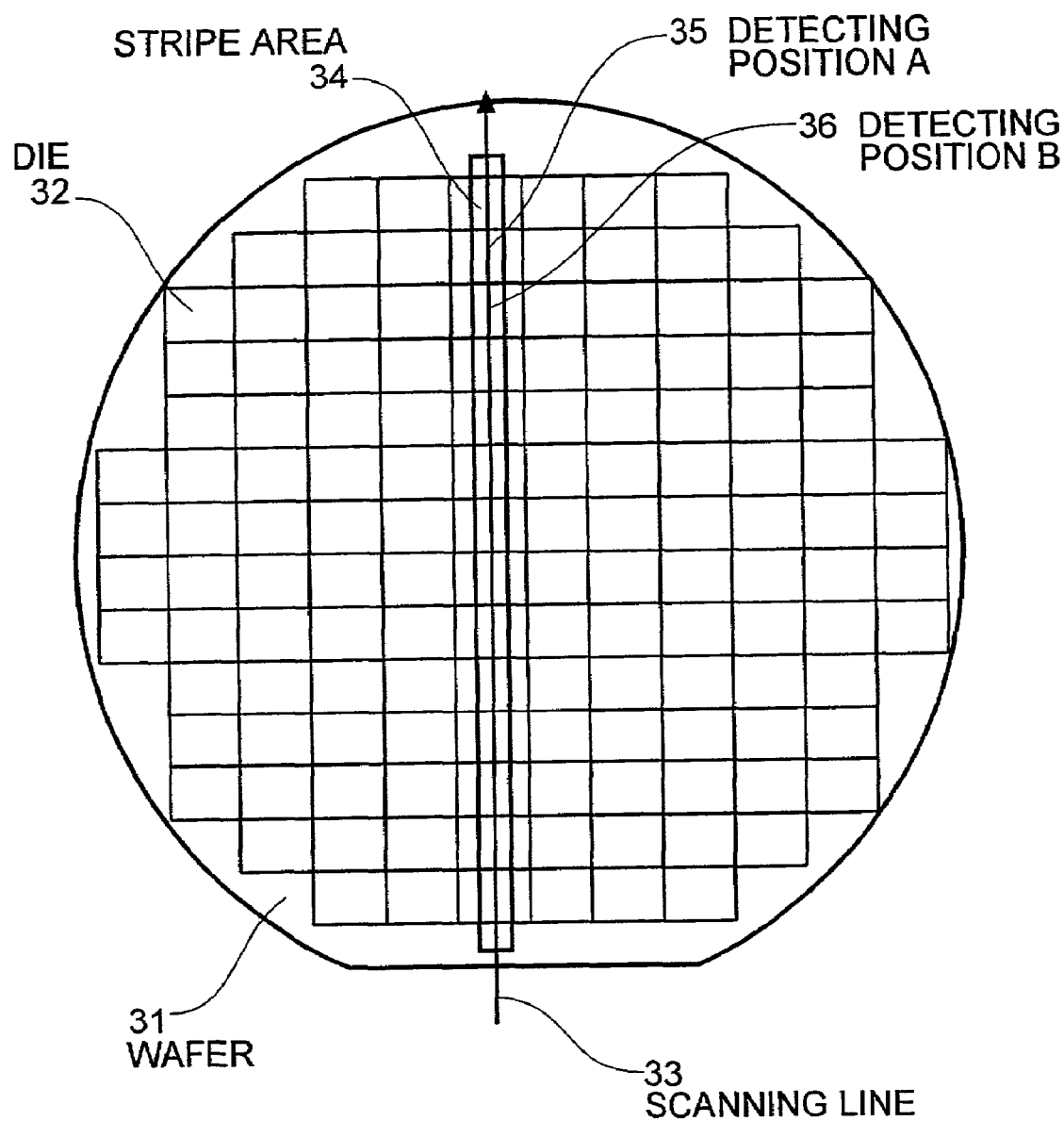
FIG. 3 is a plan view showing the layout of a wafer.
Figure 4:
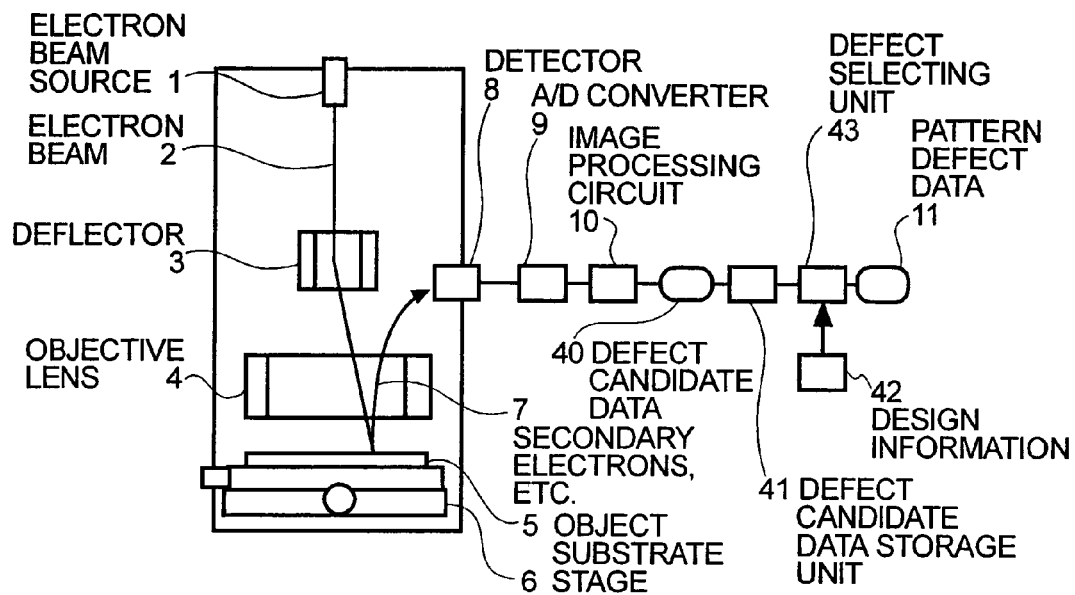
FIG. 4 is a schematic diagram of an electron beam type pattern inspecting apparatus, showing the configuration of a first means for improvement according to the present invention.
Figure 5:
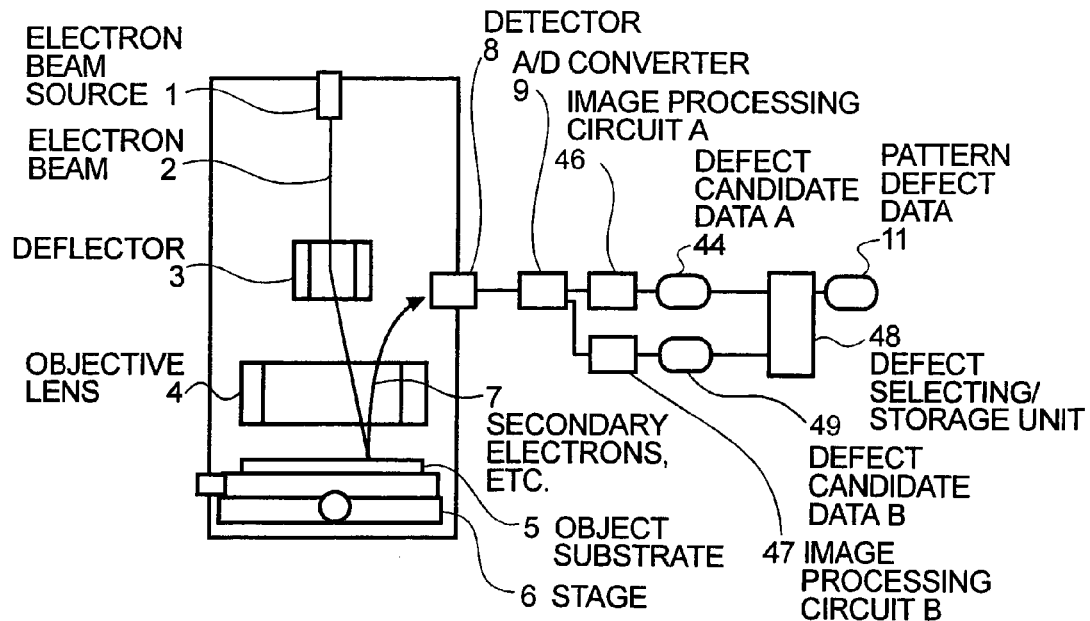
FIG. 5 is a schematic diagram of an electron beam type pattern inspecting apparatus, showing the configuration of a second means for improvement according to the present invention.
Figure 10:
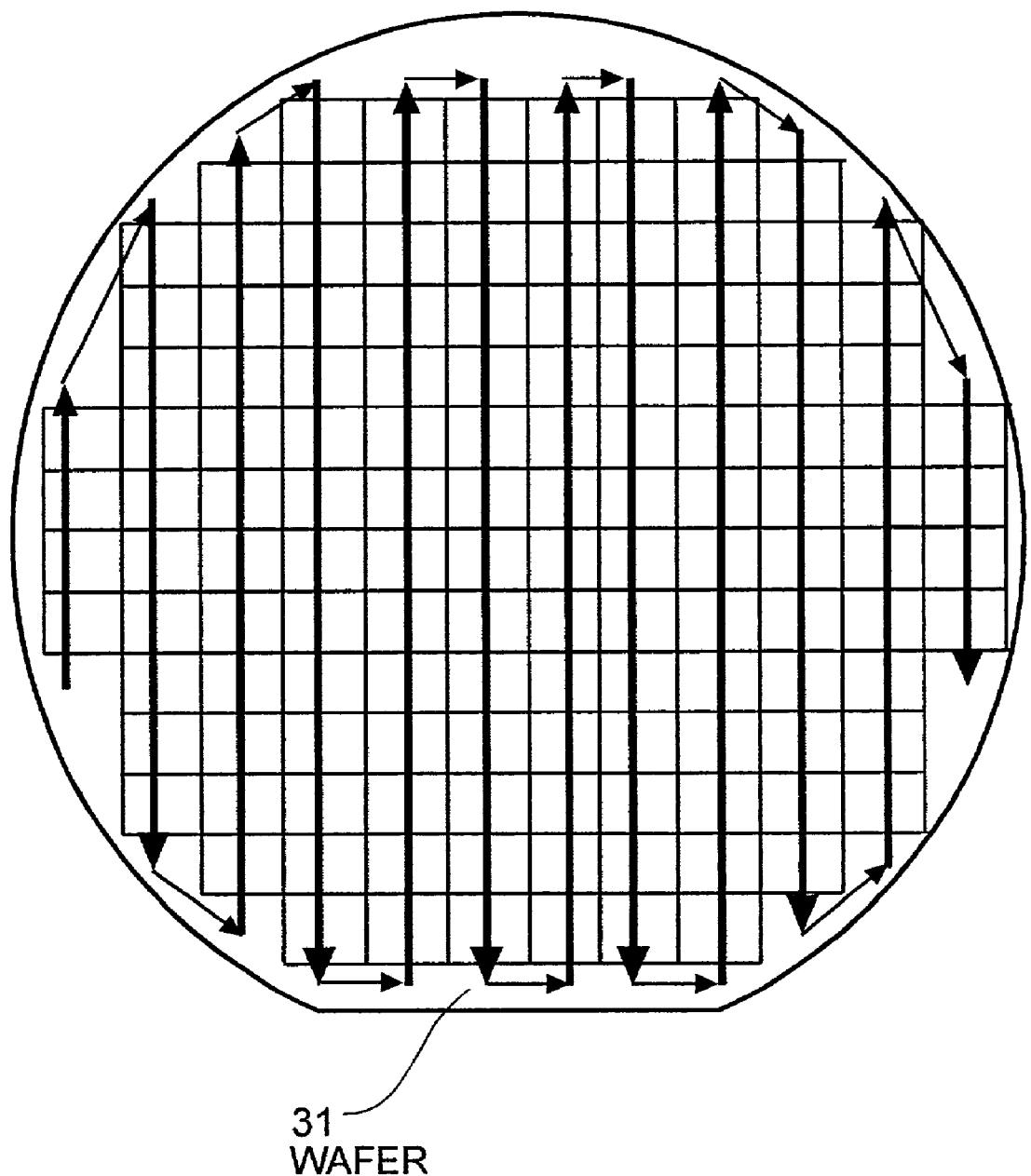
FIG. 10 is a plan view of wafer, showing an order of inspecting operations in the first embodiment.

An offset peculiar to the wafer, which is measured in advance, is added to the offset 112 to set an offset value, the Z sensor is made valid, the Z stage 6 is allowed to scan in the Y direction along the scanning line 33 shown in FIG. 3, the deflector 105 is allowed to scan in the X direction in synchronism with the stage scan, the voltage of the blanking plate 63 is cut OFF during valid inspection, and the electron beam 2 is applied to the wafer 31 to scan the wafer. Reflected or secondary electrons from the wafer 31 are detected by the detector 8, and the detected signal is subjected to A/D conversion in the A/D converter 9 to produce a digital image of the stripe area 34, which image is stored in memory 109. After the scan of the Z stage 6 is over, the Z sensor is made invalid. The stage scan is repeated to inspect the whole surface of the area required. For inspecting the whole surface of the wafer 31, the inspection is performed in accordance with the procedure shown in FIG. 10.

Figure 11:
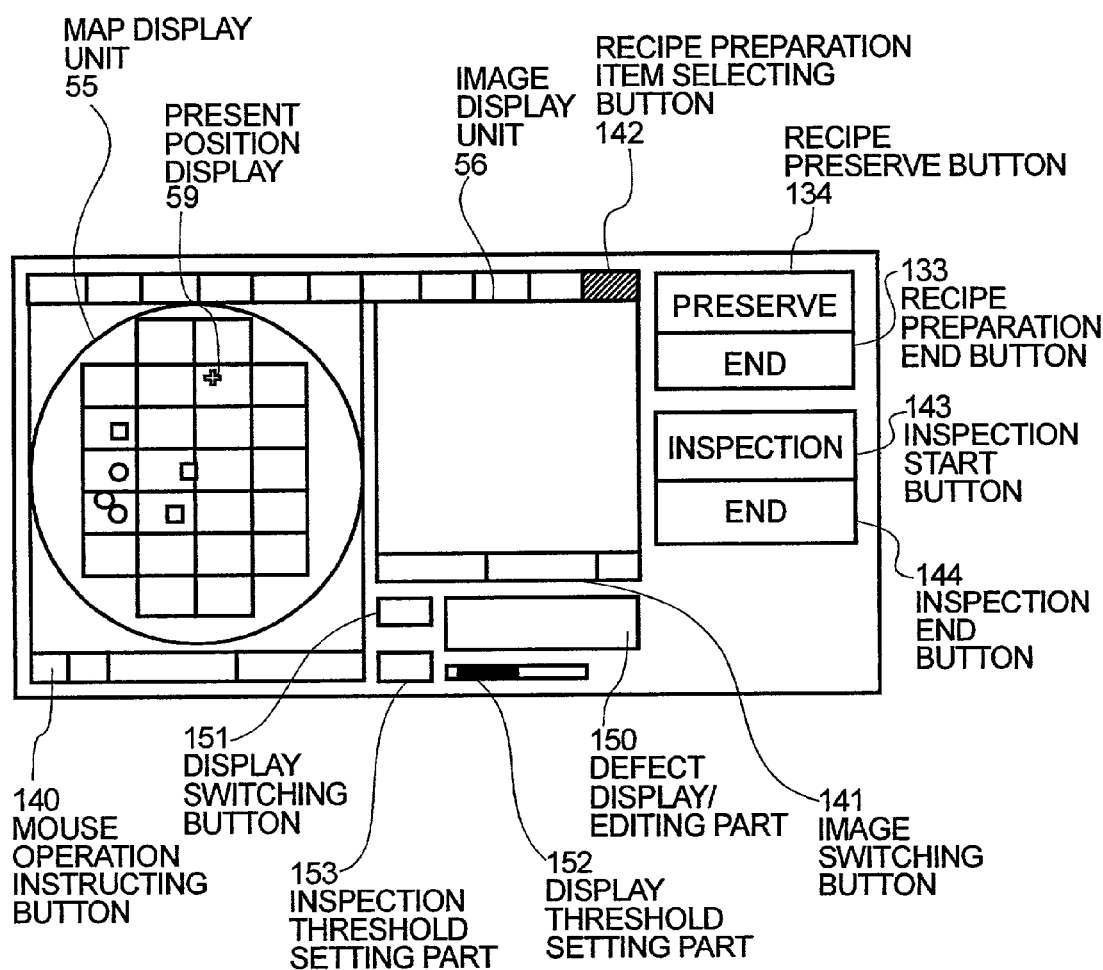
FIG. 11 is a diagram of a display screen, showing a defect acknowledging screen of a trial inspection in recipe preparation in the first embodiment.

When a detecting position A 35 is being detected by the image processing circuit 10, a comparison is made with the image of a detecting position B 36 stored in memory 109, and a place giving rise to a difference of not smaller than the initial threshold value th0 with respect to a difference between both images is extracted as a defect candidate represented by defect candidate data 40 and feature quantities of the defect candidate data 40 are extracted, such as coordinates, projection length, area, critical threshold value (a threshold value used as a boundary to detect a smaller value as a defect), difference image mean value, difference image dispersion, maximum image difference, defect image texture, reference image texture, and image information. The thus-extracted feature quantities and the difference image are transmitted to the defect candidate data storage unit 41 and are stored therein. In the defect candidate data storage unit 41, information as to whether the critical threshold value DD of the defect candidate data 40 is not smaller than an inspection threshold value thN of the N expression or not is added, provided at this time point thN is one expression and thN=th0, and a list of pattern defects ills prepared and is sent to the overall control unit 110. The overall control unit 110 receives feature quantities of the pattern defect data 11 from the defect candidate data storage unit 41. After the inspection of the required area is over, a defect acknowledging screen is displayed as shown in FIG. 11.

This defect acknowledging screen is composed of a defect display/editing part 150 that is capable of displaying feature quantities of defects and editing a classification, the map display unit 55 which displays a current position 59 and a pattern defect data 11 using a symbol for the display of the classification No., together with layout information of the wafer 31, the image display unit 56 which displays an image of the current position, a display threshold setting part 152 which sets the range of the threshold value (upper-limit threshold thh and lower-limit threshold thl) of the defect displayed, a display switching button 151 for switching between an inspecting threshold value thN of the N expression and a threshold value of the defect to be displayed included in the threshold value range set by the threshold setting part 152, an inspecting threshold setting part 153 which sets the upper-limit value thh or lower-limit value thl currently set by the display threshold setting part 152 or an arbitrary threshold value to one of the inspection threshold values thN of N expressions, and other buttons already explained above. The display switching button 151 is set to a mode for displaying the threshold value set by the display threshold setting part 152.

Upper- and lower-limit threshold values thh, thl of the display threshold setting part 152 are set. When the setting of thh and thl is changed, a comparison is made between the critical threshold value DD of each defect candidate and thh, thl and only the defect candidates of thl<DD<thh are displayed on the map display unit 55. The mouse operation instructing button 140 having produced the display is set to the selection mode and the pattern defect data ills clicked, whereby the image obtained in inspection and stored as the image information of concern, or an image obtained by re-movement to the place of a defect, is displayed in the image display unit 56 and feature quantities are displayed in the defect display/editing part 150. The pattern defect data 11 is classified on the basis of the image and the feature quantities, and the classification No. is added to the feature quantities of the pattern defect data 11 by the defect display/editing part 150.

With the classification added, the classification can be distinguished as a difference in display graphic or in display color in the map display unit. With reference to the added classification displayed in the map display unit 55, the user judges and determines the inspecting threshold values thN of the N expressions. Then, in the inspecting threshold setting part 153, setting is made to one of the inspecting threshold values thN of the N expressions. Thereafter, switching is made to a display mode of the inspecting threshold value thN by clicking the display switching button 151. Of various defect candidates, only the one satisfying DD>thN is displayed in the map display unit 55, and thus it is possible to acknowledge whether the inspecting threshold value thN is proper or not. In this display condition, if the inspecting threshold value thN is changed by the inspecting threshold setting part 153, the defect candidate displayed in the map display unit 55 changes. While looking at this change, it is possible to finely adjust the inspecting threshold value thN.

After the setting is over, the initial threshold value th0 set by the recipe preserve button and the inspecting threshold value thN of the N expression are preserved in a recipe. Further, using the inspection end button, a return is made to the initial screen of image processing condition setting. Where required, inspection results can be preserved with a result preserve button (not shown). Those detected as defect candidates 40 have a difference of not less than the initial threshold value th0. It is therefore necessary that the threshold values set by the display threshold setting part 152 and the inspecting threshold setting part 153 be larger than th0. If th0 is set sufficiently small, it is possible to set a necessary value.

On the initial screen of image processing condition setting, it is possible to again set a die for trial inspection and conduct a trial inspection. At the end of acknowledgment, the recipe end button 133 is pushed to terminate the recipe preparation. Thereafter, the wafer 31 is unloaded and returned to the original cassette 114.

The following description is directed to the inspection. To start inspection, the initial screen shown in FIG. 7 is displayed on the operating screen 52, and the user selects a rack No. where the wafer 31 of concern is located by means of the rack No. selecting part 130, designates the type and process of the wafer by means of the recipe selecting part 131, and then pushes the inspection start button 330. During the inspection, after loading and alignment and calibration of the wafer, an inspection processing is performed, followed by defect acknowledgment, defect output and subsequent unloading of the wafer to terminate the inspection. Here, reference will be made below to the inspection processing and defect check, which are associated with the present invention.

The start of inspection is instructed using the inspection start button 330. Upon starting inspection, the Z stage 6 moves to a scanning start position of an area to be inspected on the wafer 31 which is carried on the stage. An offset peculiar to the wafer which has been measured in advance, is added to the offset 112 to set an offset value. The Z sensor 113 is made valid, the Z stage 6 is scanned in the Y direction along the scanning line 33 shown in FIG. 3, the deflector 105 is scanned in the X direction in synchronism with the stage scan, the voltage of the blanking plate 63 is cut OFF in a valid scan, and the electron beam 2 is directed onto the wafer 31 to scan the wafer. Reflected electrons or secondary electrons from the wafer 31 are detected by the detector 8 and the detected signal is subjected to A/D conversion to produce a digital image, which digital image is stored in memory 109. After the scan of the Z stage 6 is over, the Z sensor 113 is made invalid. By repeating the stage scan, the whole surface of the required area is inspected. For inspecting the whole surface of the wafer 31, inspection is carried out in accordance with the procedure shown in FIG. 10.

Figure 12:
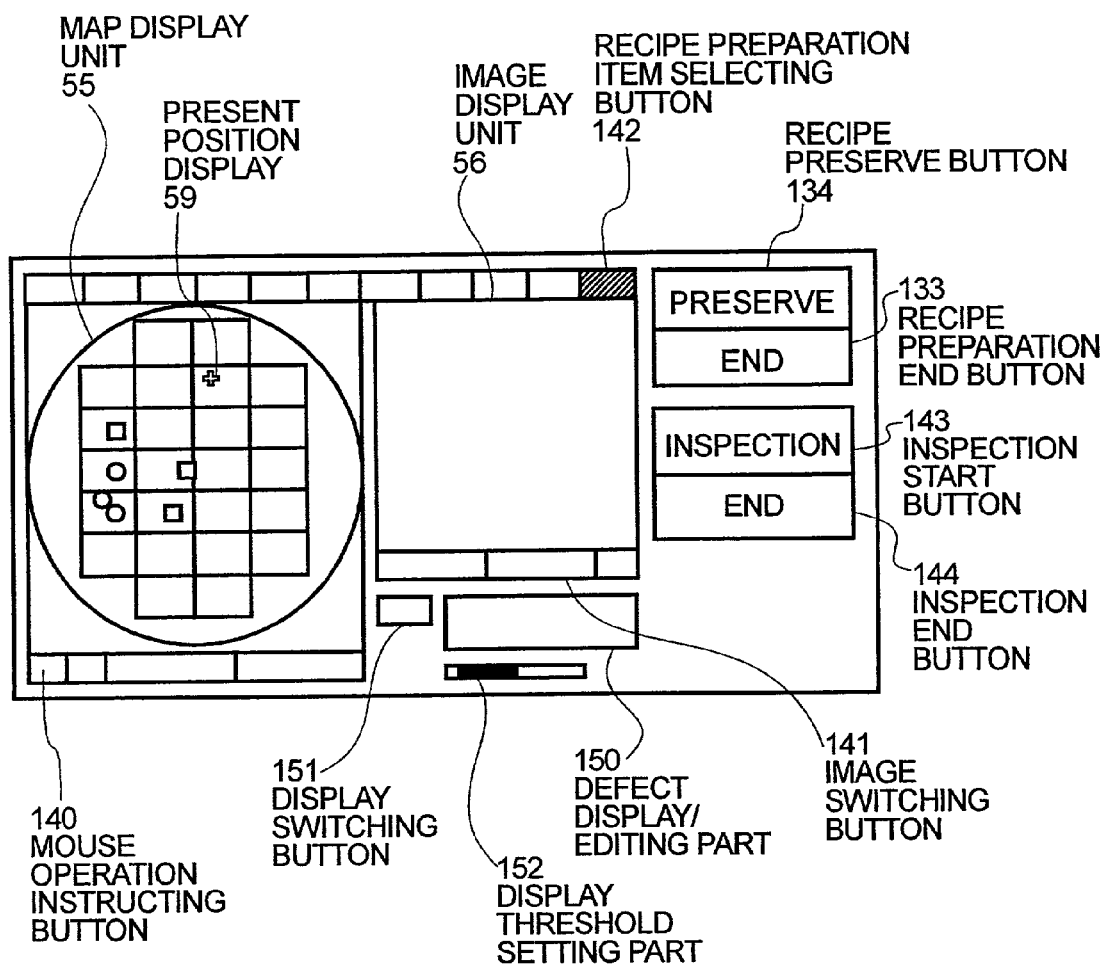
FIG. 12 is a diagram of a display screen, showing a defect acknowledging screen of inspection in the first embodiment.

When a position A 35 is being detected by the image processing circuit 10, a comparison is made with the image of a detecting position B 36 stored in memory 109 to obtain a difference image indicative of a difference between both images, and a place giving rise to a difference of not smaller than the initial threshold value th0 in the difference image is extracted as a defect candidate represented by defect candidate data 40, and feature quantities of the defect candidate are extracted, then the image of the defect candidate and the extracted feature quantities are stored in the defect candidate data storage unit 41. In the defect selecting unit 43, information as to whether the critical threshold value DD of the defect candidate data 40 stored in the defect candidate data storage unit 41s not smaller than an inspecting threshold value thN of the N expression or not, is added and a list of pattern defects 11 is prepared, which list is sent to the overall control unit 110. The overall control unit 110 receives feature quantities of the pattern defect data 11 from the defect candidate data storage unit 41. After the inspection of the required area is over, the overall control unit 110 produces a defect acknowledging screen for the inspection, as shown in FIG. 12.

The defect acknowledging screen is made up of the defect display/editing unit 150 that is capable of displaying feature quantities of defects and editing a classification; the map display unit 55 which displays a current position 59 and pattern defect data 11 using a symbol for the display of the classification No., together with layout information of the wafer 31; the image display unit 56, which displays an image of the current position; the display switching button 151 for switching the inspecting threshold value thN of the N expression; and the inspection end button 144 for instructing the end of the inspection. The mouse operation instructing button 140 is set to a selection mode. By clicking the pattern defect data 11, the image thereof is displayed in the image display unit 56, and feature quantities thereof are displayed in the defect display/editing part 150. The pattern defect data 11 is classified on the basis of its image and feature quantities and a classification No. is added to the feature quantities of the pattern defect data 11 by the defect display/editing part 150.

By switching the inspecting threshold value thN with use of the display switching button 151, it is possible to display only a defect candidate which becomes a defect. Also, by switching to a display threshold value displaying mode with use of the display switching button 151, it is possible to display defect candidates 40 falling under the threshold range thl, thh set by the display threshold setting part 152. The acknowledgment of a defect is terminated using the inspection end button, and, after the output of this result, a return is made to the initial display.

According to this embodiment, a single inspection can produce inspection results covering N expressions of threshold values. Besides, if a threshold value is found to be improper after the inspection, it is possible to amend the threshold value and make an acknowledgment. Moreover, since the setting of a threshold value and acknowledgment of a result can be done using an image obtained during inspection, a defect-or-not judgment can be made on the basis of an image obtained when the electron beam is applied the first time to the object to be inspected. In the setting of a threshold value and acknowledgment of a result, moreover, it is possible to switch over between an image obtained during inspection and a re-detected image, thus permitting a more accurate defect-or-not judgment. Further, since a defect candidate is taken out at an initial threshold value and the information thereof is held, it is also possible to meet the demand for obtaining a result in inspection carried out under a condition of higher sensitivity than the inspection threshold value. Image information is included in the defect list, so that, with respect to a defect whose importance could not be recognized at the time of defect acknowledgment, its image obtained in inspection can later be checked on the basis of a result file. Further, the result of inspection can be preserved on the defect acknowledging screen of image processing condition setting, so in the case of only a single inspection, it is possible to effect both inspection condition setting and inspection result output at one time.

Next, reference will be made below to a modification of the first embodiment of the present invention described above.

In a first modification of the first embodiment, an automatic setting is made to a minimum threshold value required, which is determined by noise of the apparatus itself and a statistical fluctuation, instead of setting the initial threshold value th0 by the operator. It is also possible to present this automatically set value to the operator first. According to this modification, there is no fear of setting a threshold value of high sensitivity that will result in detection of a large amount of defect candidates, not true defects, meaninglessly.

In a second modification of the first embodiment, instead of the critical threshold value DD being calculated in the image processing circuit 10, it is calculated in the defect selecting unit 43 from feature quantities of the defect candidate data 40, such as coordinates, projection length, area, difference image mean value, difference image dispersion, maximum image difference, defect image texture, reference image texture, and image information. If an image difference which ranks $N^{th}$ in the degree of difference is used as a feature quantity, and if a place of a large difference above a certain area is defined to be a defect, it is possible to calculate the critical threshold value DD. Moreover, if image information (two images taken out mainly from a defect portion and a reference image) is used as a feature quantity, the critical threshold value DD can be calculated by making a defect judgment equal to that in the defect selecting unit again from the two images. According to this modification, a conventional image processing circuit can be used, as it is, as the image processing circuit 10, and if the defect selecting unit 43 is constituted by software, a much reduced number of developing steps suffices.

Figure 13:
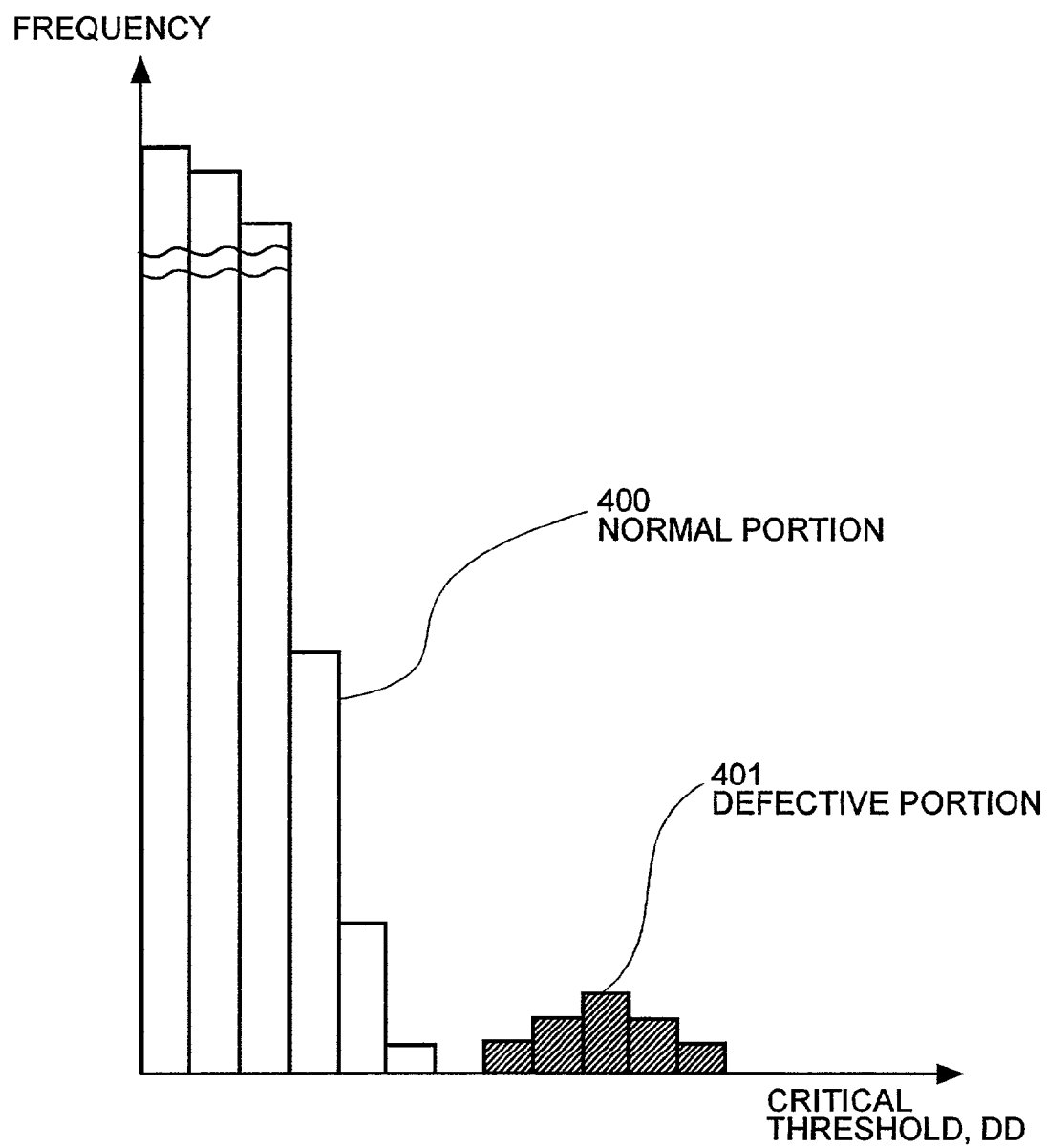
FIG. 13 is a graph showing an example of the frequency distribution of a critical threshold value DD, illustrating third and fourth modifications of the first embodiment.

In a third modification of the first embodiment, instead of the inspecting threshold values of the N expressions being set manually by the operator, the calculation is performed automatically using a frequency distribution of critical threshold values DD of various defects. An example of such a frequency distribution is shown in FIG. 13. Generally, the DD of a normal portion is small and that of a defective portion is large. Therefore, one of the inspecting threshold values of N expressions is set in a trough of the frequency distribution. It is possible to set an inspecting threshold value for distinguishing between a normal portion and a defective portion. This modification eliminates the need of setting by an operator. Besides, it is possible to assist in the setting and so even an unskilled operator can effect an accurate setting of a threshold value.

In a fourth modification of the first embodiment, the DD frequency distribution explained in the previous third modification is displayed to facilitate the operator in setting the threshold value. This modification permits a visual check, while setting an inspecting threshold value.

In a fifth modification of the first embodiment, instead of the critical threshold value DD being calculated by the image processing circuit 10, the calculation is performed in the defect selecting unit 43 on the basis of feature quantities of the defect candidate data 40, such as coordinates, projection length, area, difference image mean value, difference image dispersion, maximum image difference, defect image texture, reference image texture, and image information. Using an image difference which ranks Nth in the degree of difference and the texture of a reference image as feature quantities, if an offset is added to an image difference according to the texture, it is possible to calculate a critical threshold value DD that is proportional to the pattern density. Further, using two images (taken out mainly from a defect portion and a reference image), if a defect judgment is made from the two images in a manner different from that used in the defect selecting unit, it is possible to calculate a critical threshold value DD that is proportional to the pattern density. According to this modification, since the sensitivity can be changed according to the pattern density, it is possible to set a defect detecting sensitivity independent of the background pattern density. Moreover, it is possible to set a sensitivity condition flexibly by changing the software.

A sixth modification in the first embodiment concerns a method of judging a defect by N-expression image processing and sensitivity in the defect selecting unit 43, whereby not a mere threshold adjustment, but a more flexible judgment method matching the user needs can be selected and sensitivity adjustment can be made in accordance with the said method.

In a seventh modification of the first embodiment, when the number of defect candidates 40 stored in the defect candidate data storage unit 41 has reached a predetermined certain number, defect candidates having a small critical threshold value DD are overwritten, while allowing those having a large critical threshold value DD are allowed to remain. A method also may be adopted wherein defect candidates to be deleted are selected in accordance with a certain criterion and a delete flag is established, then defect candidates with the delete flag are overwritten by defect candidates which are added. According to this modification, a system can be constructed even with a defect candidate storage unit 43 of limited capacity.

In an eighth modification of the first embodiment, defect-or-not information in inspection using threshold values of M expressions is outputted as a feature quantity of the defect candidate data 40 from the image processing circuit 10, and in case of setting the inspecting threshold value thN of the N expression, it is selected from M expressions. According to this modification, it is not necessary to calculate the critical threshold value DD.

In a ninth modification of the first embodiment, defect-or-not information in case of making inspection in inspecting conditions of M expressions is outputted as a feature quantity of the defect candidate data 40. According to this modification, not a simple threshold value, but a noise defect eliminating parameter, such as that associated with a rank value filter, or an image processing parameter, such as an area threshold value, can be changed, and, hence, it is possible to meet user needs more flexibly. In this modification, a method involving M expressions of image processing circuits themselves is also included.

In a tenth modification of the first embodiment, test results are first preserved in a storage medium and are later read out to produce an acknowledgment of a defect. This modification is characteristic in that the defect acknowledgment can be done on the basis of image information in inspection even in the absence of the wafer to be inspected, and also in that inspection results can be obtained in case of image processing conditions, such as a decision condition and a threshold value condition, that have changed after the inspection.

Figure 14:
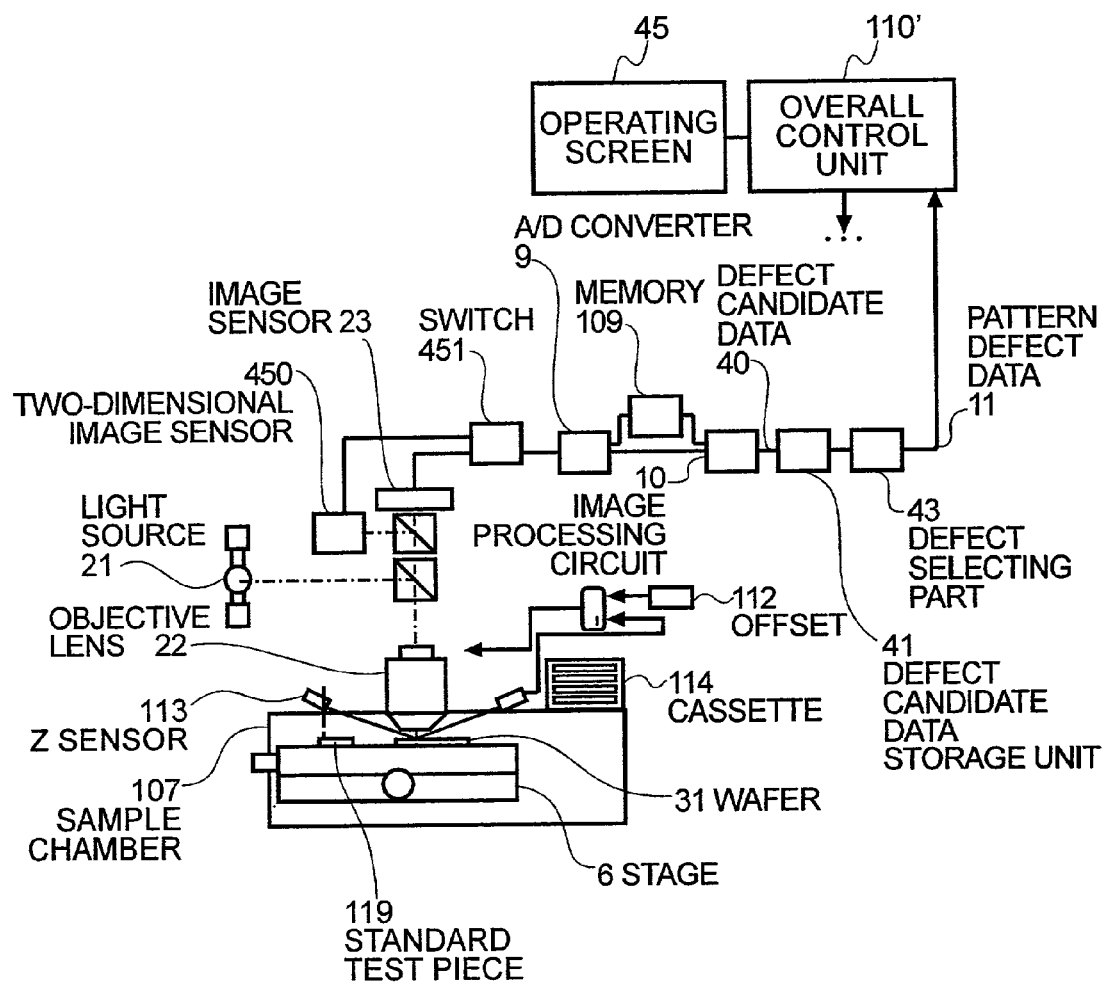
FIG. 14 is a schematic diagram of an optical pattern inspecting apparatus, showing the configuration of an eleventh modification of the first embodiment.

In an eleventh modification of the first embodiment, light is used as a detector means. The configuration of an optical pattern inspecting apparatus according to this eleventh modification is shown in FIG. 14.

The apparatus comprises a light source 21; an objective lens 22, which converges light from the light source 21 onto a wafer 31 as an object substrate through a half mirror (a reference numeral thereof not set yet); a sample chamber 107; and a Z stage 6, which carries the wafer 31 thereon and which permits image detection at an arbitrary position. A one-dimensional image sensor 23 detects reflected light from the wafer 31; a two-dimensional image sensor 450 also detects the reflected light; and a switch 451 switches signals between the one- and two-dimensional image sensors 23, 450. An A/D converter 9 is provided for A/D conversion of the switched, detected signal into a digital image, and a memory 109 stores the digital image.

An image processing circuit 10 compares the image stored in the memory 109 with the digital image resulting from A/D conversion and which detects a place giving rise to a difference as a defect candidate represented by defect candidate data 40. A defect candidate data storage unit 41 stores the feature quantities of the defect candidate data 40, such as coordinates, projection length, area, critical threshold value DD (a threshold value as a boundary to detect a smaller value as a defect), difference image mean value, difference image dispersion, maximum image difference, defect image texture, reference image texture, and image information, and a defect selecting unit 43 outputs pattern defect data ii with information added to the defect candidate data 40 read from the defect candidate data storage unit 41. An overall control unit 110' (a control line from the overall control unit 110' is omitted in the figure), which controls the whole of the apparatus and receives the pattern defect data 11 from the defect selecting portion 43, sends data to a display unit including an operating screen 52 for various operations, as well as a keyboard and a mouse and a knob (none of them are shown) which instruct operations.

A Z sensor 113 measures the height of the wafer 31 and controls the current value of the objective lens 22 by adding an offset 112 thereto, thereby keeping constant a focal position of a detected digital signal. A loader (not shown) is provided for loading and unloading the wafer 31 present within a cassette 114 with respect to the sample chamber 107, and an orientation flat detector (not shown) is provided for positioning the wafer 31 on the basis of an external shape of the wafer. A standard test piece 119 is mounted on the Z stage 6.

The operation of this apparatus will now be described. The operation involves a conditioning operation for setting a threshold value of N expression like the SEM type and an inspection in which there is outputted pattern defect information with defect-or-not information added to the detected defect candidate data 40 in each threshold value. Reference will here made to only a portion that is different from the SEM type. When a condition setting operation is started, the overall control unit 110 instructs the components to operate in accordance with the following procedure. A command is issued to the loader (not shown), which in turn takes the wafer 31 from the cassette 114. The position of the wafer 31 is established on the basis of its external shape by means of the orientation flat detector (not shown) and is put onto the Z stage 6. The Z stage 6 is moved to align the standard test piece 119, the Z sensor 113 is made valid, and the focal point is adjusted by keeping the position of the objective lens 22 constant at a detected value of the Z sensor 113 plus the offset 112.

The switch 451 is changed over to the two-dimensional image sensor 450 and a signal detected by the image sensor 450 is converted into a digital image by the A/D converter 9. Plural digital images are detected by changing the offset 112, and an optimum offset corresponding to the largest intra-image total of image differential values is set as a current offset value. After this setting, the Z sensor is made invalid and the screen is shifted to the contrast adjusting screen shown in FIG. 8.

The contrast adjusting screen is composed of a map display unit 55 provided with a button for controlling a map display method, such as the display of a map and the whole of the wafer or die; and, the screen is also provided with a mouse operation instructing button 140 for instructing movement to a selected place or selection of an item thereof on being selected by the mouse, an image display unit 56 provided with an image switching button 141 for designating a portion of the image detected by the two-dimensional image sensor 450 for display and a digitally zoomed magnification of the image, as well as a recipe preparation item selecting button 142, a recipe preparation end button 133, and a recipe preserve button 134.

On the contrast adjusting screen, the mouse operation instructing button 140 is set to a movement mode, and the mouse 121 is clicked for movement on the map, whereby the image of the place of concern is displayed on the image display unit. The knob 122 is allocated to the offset 112 and is adjusted to obtain an appropriate contrast. The value of this adjustment is stored as offset peculiar to the wafer. The recipe preparation end button 133, the recipe preserve button 134, and the recipe preparation item selecting button 142 instruct the end of recipe preparation, preservation of recipe condition, and setting of another condition and screen transition, respectively. These buttons are common to all screens. By switching the recipe preparation item selecting button 142 to an image processing condition setting screen, a shift to the image processing condition setting screen shown in FIG. 9 is effected.

A trial inspection starting screen is composed of the map display unit 55, recipe preparation end button 133, recipe preserve button 134, recipe preparation item selecting button 142, inspection start button 143, inspection end button 144, and initial threshold setting part 145. The mouse operation selecting button 140 is set to a selection mode. When the user clicks a die in the map display unit, a select/non-select switching is carried out for the die to be inspected on a trial basis and the die to be inspected is selected. After selection of the die to be inspected and setting of an initial threshold value th0 (not shown) by the initial threshold setting part 145, the start of trial inspection is instructed by clicking the inspection start button 143. Upon start of the trial inspection, the Z stage 6 is moved to a scanning start position of a to-be-inspected area of the wafer 31 carried on the stage.

An offset peculiar to the wafer, which is measured in advance, is added to the offset 112 to set an offset value, the Z sensor 113 is made valid, and the switch 451 is changed over to the image sensor 23. The Z stage 6 is allowed to scan in the Y direction along the scanning line 33 shown in FIG. 3, reflected light is detected by the image sensor 23, and then a digital image of the stripe area 34 is obtained by the A/D converter 9 and is stored in memory 109. After the scan of the Z stage 6 is over, the Z sensor 113 is made invalid. The stage scan is repeated to inspect the whole surface of the area required. For inspecting the whole surface of the wafer 31, the inspection is performed in accordance with the procedure shown in FIG. 10. This modification is characteristic in that defect species different from that in the SEM type can be detected because the wafer 31 can be inspected using an optical inspection apparatus.

Figure 15:
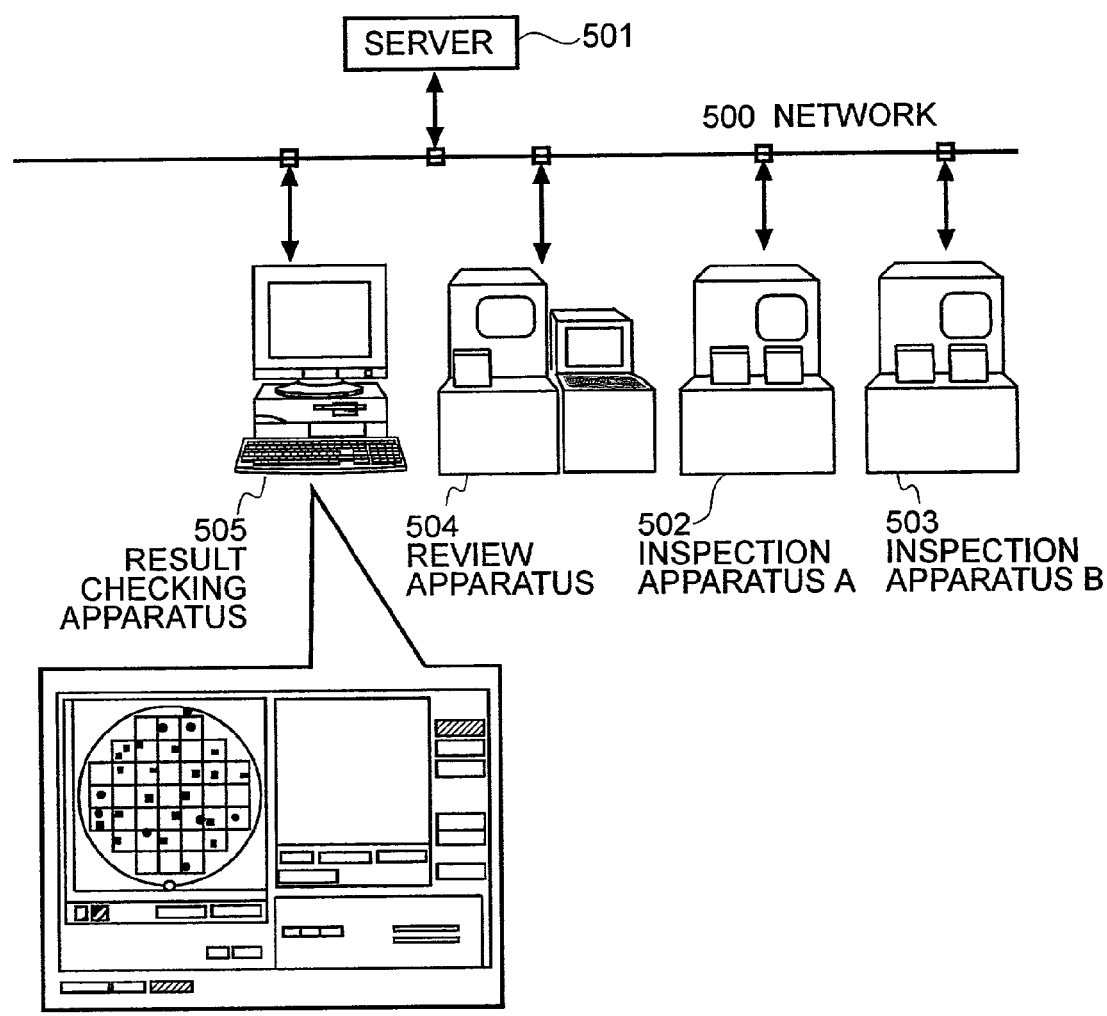
FIG. 15 is a system configuration diagram showing a network as the configuration of a twelfth modification of the first embodiment.

The configuration of a twelfth modification of the first embodiment is shown in FIG. 15, which illustrates a connected configuration to a network 500. More specifically, a server 501, inspection apparatuses A 502 and B 503, a review apparatus 504, and a defect checking apparatus 505 are connected to the network 500. Information in the form of pattern defect data 11 detected by the inspection apparatuses A 502 and B 503 is first stored in the server 501 through the network. In the server 501, there are stored the image in the form of defect candidate data 40 and information of its feature quantities, with information added thereto, which information indicates whether the critical threshold value DD of the defect candidate is not smaller than the inspecting threshold value thN of the N expression. In the defect checking apparatus 505, a screen display is provided as explained above in connection with FIGS. 7, 8, 11 and 12. That is, through the network, a scan on the screen such as described above can be performed by the defect checking apparatus 505.

The following description is directed to the observing of a defect candidate of wafer 31 that has been inspected by the inspection apparatus A 502 or B 503, which observation is made in detail by the review apparatus 504.

First, the wafer 31 that has been inspected by the inspection apparatus A 502 or B 503 is set to the review apparatus 504.

At the time of review there is displayed the defect acknowledging screen in inspection shown in FIG. 12. At this time, as the image displayed in the image display unit 56, an image obtained in inspection by the inspection apparatus A 502 or B 503, or an image obtained by movement to a defect position using the review apparatus, can be displayed selectively by switching from one to the other, whereby the obtained image in inspection can be checked by the review apparatus. Besides, by change-over of the inspecting threshold setting part 153, the inspecting threshold value thN of the N expression can be checked selectively on the review apparatus. Moreover, the threshold value to be displayed can be adjusted by adjusting the display threshold setting part 152.

In this way, it is possible to obtain much information on the review apparatus, and a required judgment can be given accurately. Moreover, by using image information in inspection for an automatic defect classifying function on the review apparatus, it is possible to simplify the sequence partially and attain a more accurate classification. The defect checking apparatus 505 does not handle the wafer 31, but analyzes information of the pattern defect data 11.

As the image to be displayed on the image display unit 56, it is possible to use the image obtained in inspection by the inspection apparatus A 502 or B 503. In this way it is possible to check the image obtained in inspection when analysis is made by the defect checking apparatus 505. Besides, by change-over of the inspecting threshold setting part 153, the inspecting threshold value thN of the N expression can be acknowledged selectively on the review apparatus. Moreover, the threshold value to be displayed can be adjusted by adjusting the display threshold setting part 152. As a result, much information on the defect checking apparatus 505 can be obtained, and it is possible to give a required judgment accurately.

Further, in case of handling information of plural wafers on the defect checking apparatus, it is possible to acknowledge a change of information in case of the display threshold value being changed and a change of information in case of plural inspecting threshold values thN being switched over. Additionally, when it becomes necessary to obtain further information on a defect of a specific place in the course of analysis, it is possible to check the image obtained in inspection even after the wafer of concern is already absent. Consequently, much information can be obtained in the statistical analysis of plural wafers, thus permitting an exact judgment. In the case where the wafer is a memory product, a defect of a specific place becomes an issue after an electrical characteristic inspection even in the case of another product at the time of correlation with a fail bit map. Even after the wafer of concern is already absent, it is possible to check the image obtained in inspection. Thus, at the time of correlation with the fail bit map, much information can be obtained in an electrical characteristic inspection, and hence, it is possible to make an exact judgment.

Although it has been indicated above that information is transmitted through the server 501, it is also possible to transmit information directly to a required apparatus. This is effective in constructing a system having a small scale.

Although the transmission of information has been described as being carried through the network, a storage medium, such as a floppy disk, Mo disk, DVDRAM, or tape, may be used. In this case, information to be transmitted is preserved for a certain period, for example, until the fabrication of the wafer is completed or semi-permanently, and it can be read out and checked whenever necessary.

In a thirteenth modification of the first embodiment, FIG. 11, not FIG. 12, is used as a defect acknowledging screen in inspection. According to this thirteenth modification, it is possible to change the inspecting threshold value even during actual inspection. Conditions can be set in a more flexible manner.

Second Embodiment

Figure 16:
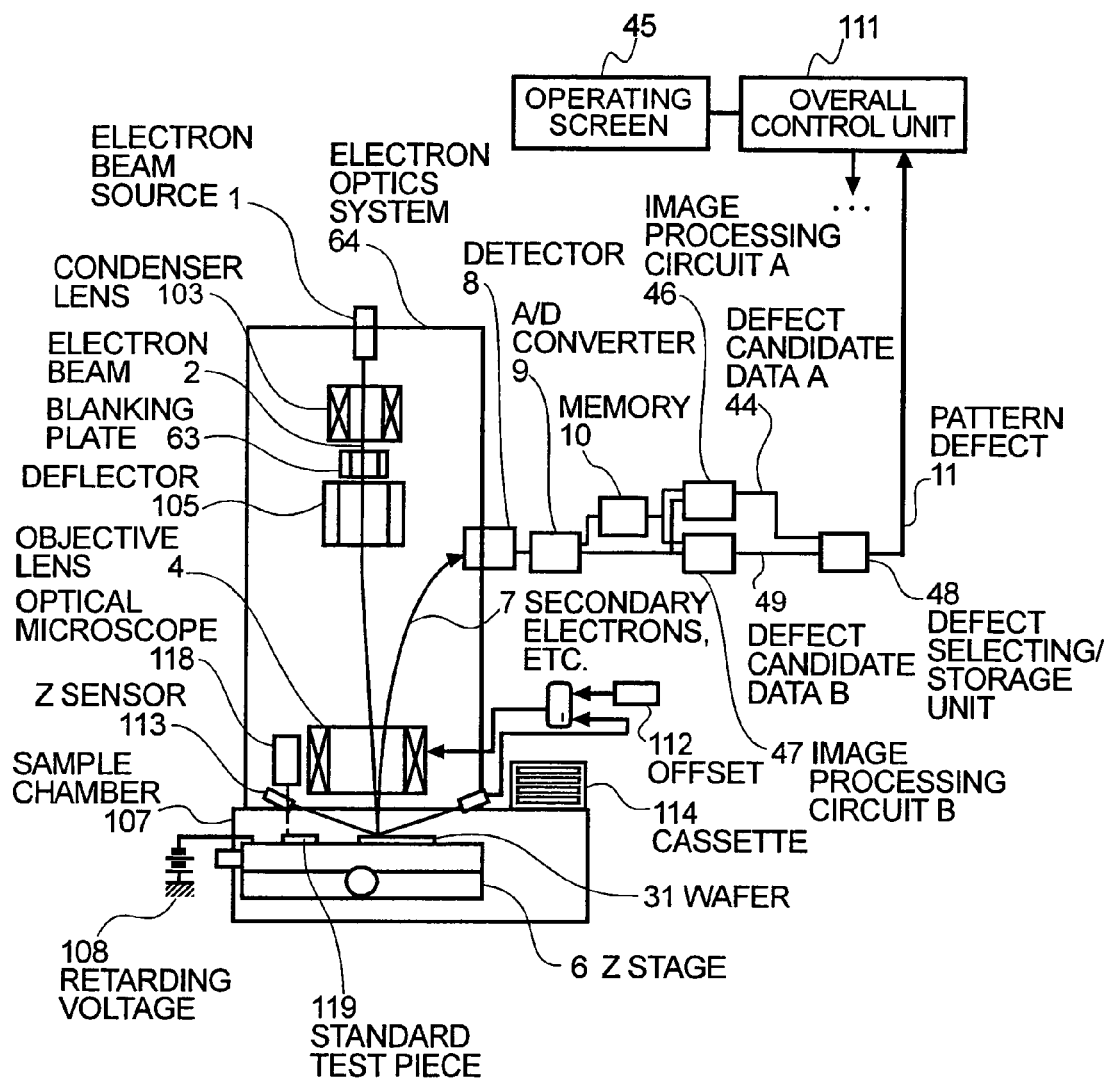
FIG. 16 is a schematic diagram of an electron beam type pattern inspecting apparatus, showing the configuration of a second embodiment of the present invention.

A second embodiment of the present invention will be described with reference to FIG. 16, which shows an example of the configuration of the second embodiment.

A pattern inspecting apparatus according to this second embodiment is made up of an electron beam source 1 having an electron gun for emitting an electron beam 2, and an electron optical system which extracts the electron beam 2 from the electron beam source 1 while accelerating it and which forms a virtual light source at a certain position with use of an electrostatic or electromagnetic lens. The electron optical system comprises a condenser lens 103 for converging the electron beam 2 from the virtual light source to a certain position, a blanking plate 63 installed near a position where the electron beam is converged by the electron gun to effect ON/OF control of the electron beam 2, a deflector 105 for deflecting the electron beam 2 in XY directions, and an objective lens 4 for converging the electron beam 2 onto an object substrate 5. The apparatus further includes a sample chamber 107 which holds wafer 31 as the object substrate in a vacuum, a Z stage 6 with the wafer 31 carried thereon and to which a retarding voltage 108 is applied which permits image detection at an arbitrary position, and a detector 8 for detecting secondary electrons, etc. generated from the object substrate 5.

An A/D converter 9 is provided for subjecting a detected signal received from the detector 8 to A/D conversion to obtain a digital image, and a memory 109 operates to store the digital image. An image processing circuit A 46 compares the image stored in the memory 109 with the digital image obtained by A/D conversion and detects a place giving rise to a difference as a defect candidate represented by defect candidate data A 44 (in the defect candidate data A 44 there are included such feature quantities as coordinates, projection length, area, critical threshold value DD (a threshold value used as a boundary to detect a smaller value as a defect), difference image mean value, difference image dispersion, maximum image difference, defect image texture, reference image texture, and image information). An image processing circuit B47 compares the image stored in the memory 109 with the digital image obtained by A/D conversion and detects a place giving rise to a difference as a defect candidate represented by defect candidate data B 49 (in the defect candidate data B 49 there are included such feature quantities as coordinates, projection length, area, critical threshold value DD (a threshold value used as a boundary to detect a smaller value as a defect), difference image mean value, difference image dispersion, maximum image difference, defect image texture, reference image texture, and image information). A defect selecting/storage unit 48 selects and stores defect candidates A 44 and B 49. An overall control unit 111, which controls the entire apparatus, receives the pattern defect data 11 from the defect selecting/storage unit 48 (a control line from the overall control unit 111 is omitted in the figure) and provides data to a display device having an operating screen 52 for various operations, a keyboard and a mouse and a knob for instructing operations (none of them are shown).

A Z sensor 113 measures the height of the wafer 31 and keeps constant a focal position of a digital image detected by controlling the current value of the objective lens 4 with offset added thereto. A loader (not shown) is provided for loading and unloading the wafer 31 present within a cassette 114 with respect to the sample chamber 107, and an orientation flat detector (not shown) positions the wafer 31 on the basis of the external shape of the wafer. An optical microscope 118 is provided for observing the pattern on the wafer 31, and a standard test piece 119 is mounted on the Z stage 6.

The operation of the second embodiment will now be described. The operation involves a conditioning operation for setting a threshold value of the N expression and an inspection in which there is outputted pattern defect information with defect-or-not information added to the detected defect candidate data 40 in each threshold value.

The start of conditioning is performed by displaying the initial screen shown in FIG. 7, and the adjustment of contrast is performed using the contrast adjusting screen shown in FIG. 8. These are the same operations as used in the first embodiment.

Figure 17:
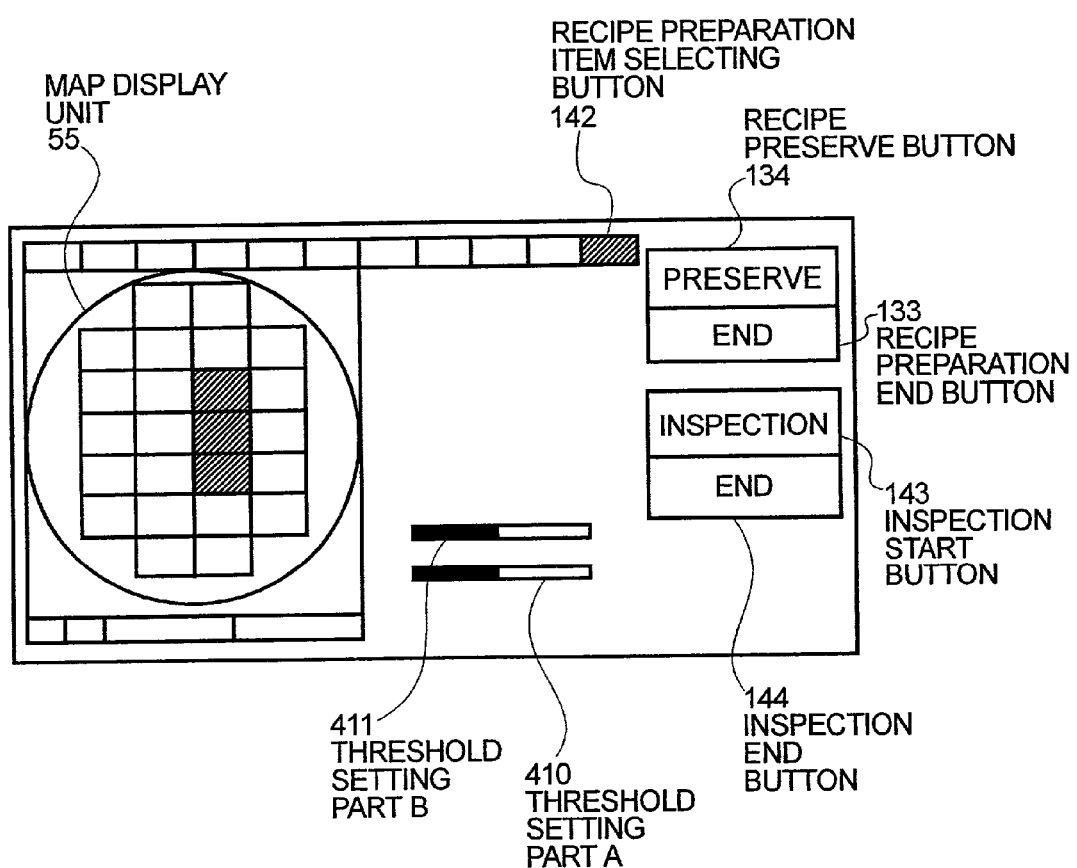
FIG. 17 is a diagram of a display screen, showing an initial screen of a trial inspection in recipe preparation in the second embodiment.

After the adjustment of contrast, a shift to the image processing condition setting screen shown in FIG. 17 is effected by switching a recipe preparation item selecting button 142 to the image processing condition setting screen.

The image processing setting screen is composed of a map display unit 55, recipe preparation end button 133, recipe preserve button 134, recipe preparation item selecting button 142, inspection start button 143, inspection end button 144, threshold setting part A 410 for the image processing circuit A 46, and threshold setting part B 411 for the image processing circuit B 47. A mouse operation instructing button 140 is set to a selection mode. When the user clicks a die in the map display unit, a select/non-select switching is carried out for the die to be inspected on a trial basis and the die to be inspected is selected. After selection of the die to be inspected and setting of threshold values thA and thB (neither shown) by the threshold setting parts A 410 and B 411, respectively, the start of trial inspection is instructed by clicking the inspection start button 143.

When trial inspection is started, the Z stage 6 is moved to a scan start position of a to-be-inspected area of the wafer 31 carried on the stage. An offset peculiar to the wafer, which is measured in advance, is added to the offset 112 to set an offset value, the Z sensor 113 is made valid, the Z stage 6 is allowed to scan in the Y direction along the scanning line shown in FIG. 3, the deflector 105 is allowed to scan in the X direction in synchronism with the stage scan, the voltage of the blanking plate 63 is cut OFF during valid inspection, and the electron beam 2 is applied to the wafer 31 to scan the wafer. Reflected electrons or secondary electrons from the wafer 31 are detected by the detector 8, and a digital image of a stripe area 34 is obtained by the A/D converter 9 and is stored in the memory 109. After the scan of the Z stage 6 is over, the Z sensor 113 is made invalid. The stage scan is repeated to inspect the whole surface of the area required. For inspecting the whole surface of the wafer 31, the inspection is performed in accordance with the procedure shown in FIG. 10.

Figure 18:
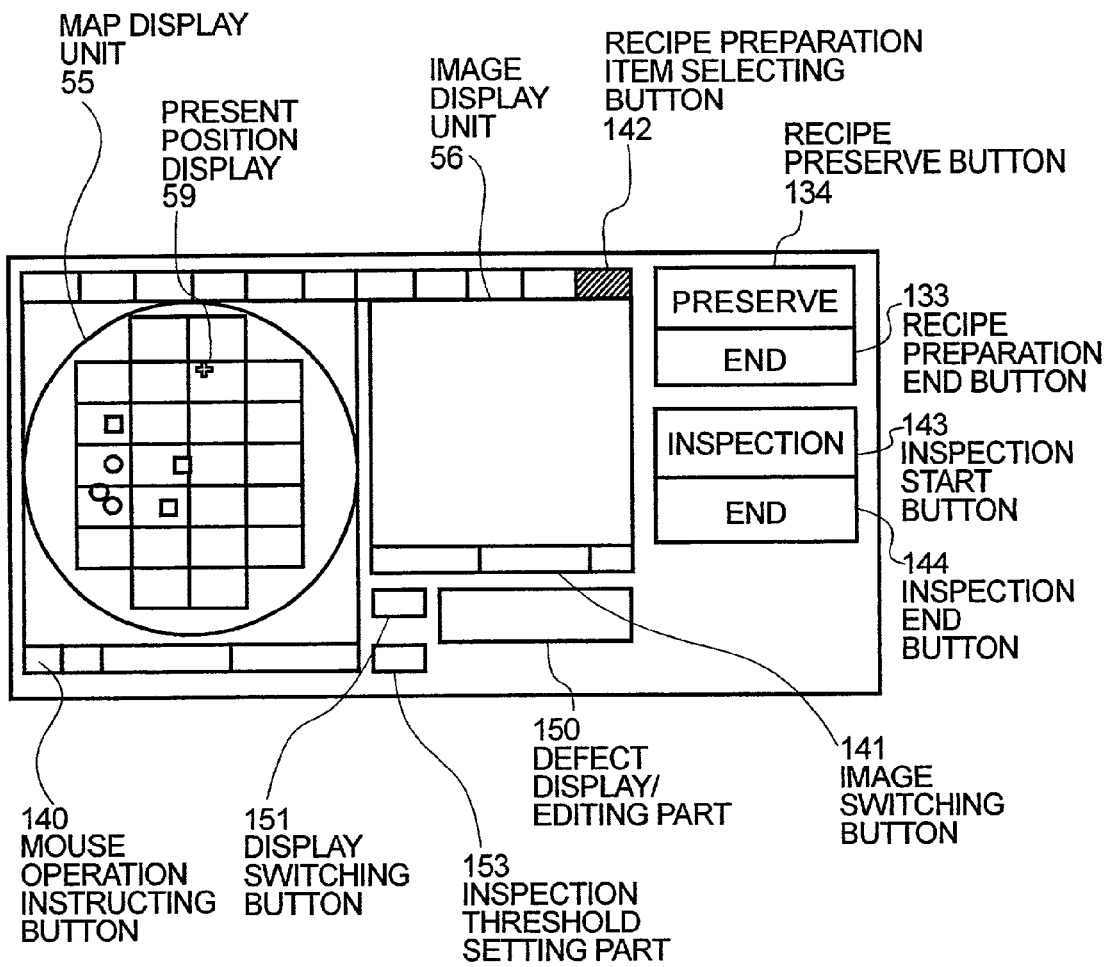
FIG. 18 is a diagram of a display screen, showing a defect acknowledging screen of a trial inspection in recipe preparation in the second embodiment.

When a detecting position A 35 is being detected by the image processing circuits A 46 and B 47, a comparison is made with the image of a detecting position B 36 stored in the memory 109, and places giving rise to a difference of not smaller than the threshold values thA and thB are extracted as defect candidates A 44 and B 49, respectively. Then, in the defect selecting/storage unit 48, the defect information pieces are merged and information on the appearance of a defect in only the defect candidate data A 44 or B 49 or both is added to prepare a list of pattern defects 11, which is sent to the overall control unit 111. The overall control unit 111 receives feature quantities of the pattern defects 11 from the defect candidate data storage unit 41. After the inspection of the required area is over, the defect acknowledging screen shown in FIG. 18 is displayed.

This defect acknowledging screen is made up of a defect display/editing unit 150 that is capable of displaying feature quantities of defects and editing a classification, the map display unit 55 which displays a current position 59 and pattern defect data 11 using a symbol for the display of the classification No., together with layout information of the wafer 31, an image display unit 56 which displays an image of the current position, a display switching button 151 for switching the display of defect candidate data A 44 and that of the defect candidate data B 49 from one to the other, and various buttons already described above. Defect candidates A 44 and B 49 to be displayed are switched over from one to the other.

The mouse operation instructing button 140 is set to a selection mode, and the pattern defect data 11 is clicked, whereby the image obtained in the inspection and preserved as image information thereof, or an image obtained by re-movement to the place of a defect, is displayed in the image display unit 56, and feature quantities thereof are displayed in the defect display/editing part 150. The pattern defect data 11 is classified on the basis of the image and feature quantities, and the classification No. is imparted to the feature quantities of the pattern defect data 11 by the defect display/editing part 50. With the classification thus added, the map display unit permits the classification to be distinguished as a difference in display graphic or display color. With reference to the added classification displayed in the map display unit 55, the operator checks whether the threshold values thA and thB are proper or not. If the setting is not satisfactory, a return is made to the image processing condition setting screen, in which condition setting, inspection and defect acknowledgment are performed again. After completion of the setting, the thus-set threshold values thA and thB are preserved in recipe with operation of the recipe preserve button 134. With operation of the inspection end button 144, a return is made to the initial screen in trial inspection.

After the end of preservation, a return is made to the defect acknowledging screen in trial inspection by operation of an end button. Further, with operation of the inspection end button 144 on the defect acknowledging screen, a return is made to the initial screen in trial inspection. It is also possible to again set an inspection die in trial inspection and carry out a trial inspection. At the end of acknowledgment, the recipe end button 133 is pushed to terminate the preparation of recipe, whereupon the wafer 31 is unloaded and is returned to the original cassette 114.

Reference will now be made to inspection. Inspection is started through the steps of displaying the start screen shown in FIG. 7 on the operating screen 52, selecting a rack No. in which the wafer 31 is resting thereon by the user through a rack No. selecting part 130, designating the type and process of wafer 31 by a recipe selecting part 131, and pushing an inspection start button 330. The inspection involves the steps of loading, alignment and calibration of the wafer, subsequent inspection, defect check, defect output, and subsequent unloading of the wafer to terminate the inspection.

Here, the description given below is directed to the inspection and defect check which are associated with the present invention.

The start of inspection is instructed with operation of the inspection start button 330. When inspection is started, the Z stage 6 is moved to a scan start position of a to-be-inspected area of the wafer 31 carried on the stage. An offset peculiar to the wafer, which is measured in advance, is added to the offset 112 to set an offset value, the Z sensor 113 is made valid, the Z stage 6 is allowed to scan in the Y direction along the scanning line 33 shown in FIG. 3, the deflector 105 is allowed to scan in the X direction in synchronism with the stage scan, the voltage of the blanking plate 63 is cut OFF during valid inspection, and the electron beam 2 is applied to the wafer 31 to scan the wafer. Reflected or secondary electrons from the wafer 31 are detected by the detector 8 and the detected signal is subjected to A/D conversion in the A/D converter 9 to produce a digital image of the stripe area 34, which image is stored in the memory 109. After the scan of the Z stage 6 is over, the Z sensor 113 is made invalid. The whole surface of the required area is inspected by repeating the stage scan. For inspecting the whole surface of the wafer 31, the inspection is performed in accordance with the procedure shown in FIG. 10.

Figure 19:
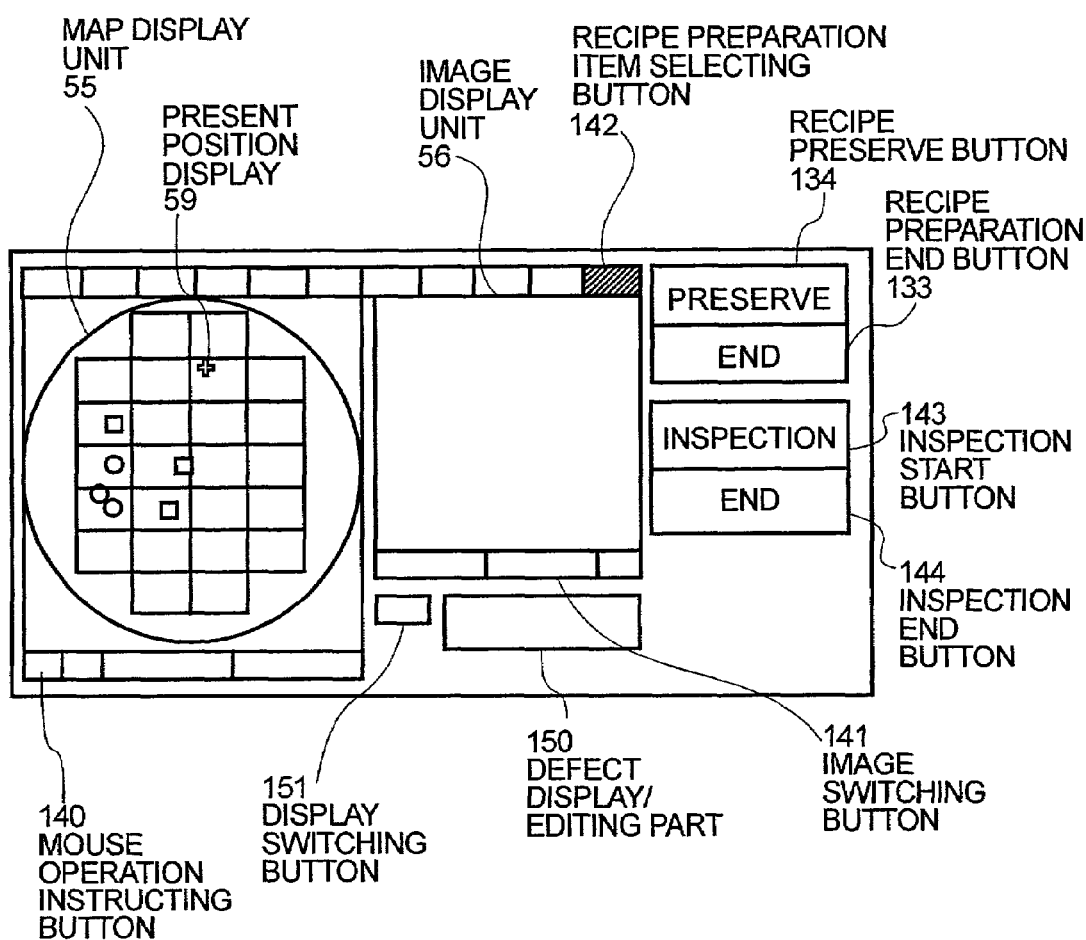
FIG. 19 is a diagram of a display screen, showing a defect acknowledging screen of inspection in the second embodiment.

When a detecting position A 35 is being detected by the image processing circuits A 46 and B 47, a comparison is made with the image of a detecting position B 36 stored in the memory 109, and places giving rise to a difference of not smaller than the threshold values thA and thB are extracted as defect candidates A 44 and B 49, respectively. Then, a list of pattern defects ii is prepared in the defect selecting/storage unit 48 and is sent to the overall control unit 111. The overall control unit 111 receives feature quantities of the pattern defects 11 from the defect candidate data storage unit 41. After the inspection of the required area is over, the defect acknowledging screen shown in FIG. 19 is displayed.

The defect acknowledging screen is made up of the defect display/editing unit 150 that is capable of displaying feature quantities of defects and editing a classification, the map display unit 55 which displays a current position 59 and pattern defect data 11 using a symbol for the display of classification No., together with layout information of the wafer 31, the image display unit 56 which displays an image of the current position, the display switching button 151 for switching the display of defect candidate data A 44 and that of defect candidate data B 49 from one to the other, and the inspection end button 144 for instructing the end of inspection. The mouse operation instructing button 140 is set to a selection mode and the pattern defect data 11 is clicked, whereby an image is displayed in the image display unit 56 and feature quantities thereof are displayed in the defect display/editing part 150. The pattern defect data 11 is classified on the basis of the image and feature quantities, and the classification No. is imparted to the feature quantities of the pattern defect data 11 by the defect display/editing part 150. The threshold value thN is switched by the display switching button 151, which switches over the inspection threshold value thN of the N expression, and, with this threshold value, it is possible to display only the defect candidate which becomes a defect. The defect check is terminated with operation of the inspection end button and a return is made to the initial screen after the output of a result.

According to this embodiment, inspection results of N-expression threshold values can be obtained in a single inspection. Besides, since the image obtained in inspection can be used in the threshold setting and the result check, a defect-or-not judgment can be made on the basis of the image obtained when the electron beam is first applied to the object to be inspected. Moreover, since threshold setting and a result check can be carried out while switching over between the image obtained in inspection and a re-detected image, a defect-or-not decision can be made more accurately. Further, since image information is included in the defect list, as to a defect whose importance could not be recognized at the time of a defect check, an image thereof obtained in inspection can be checked later.

Third Embodiment

Figure 20:
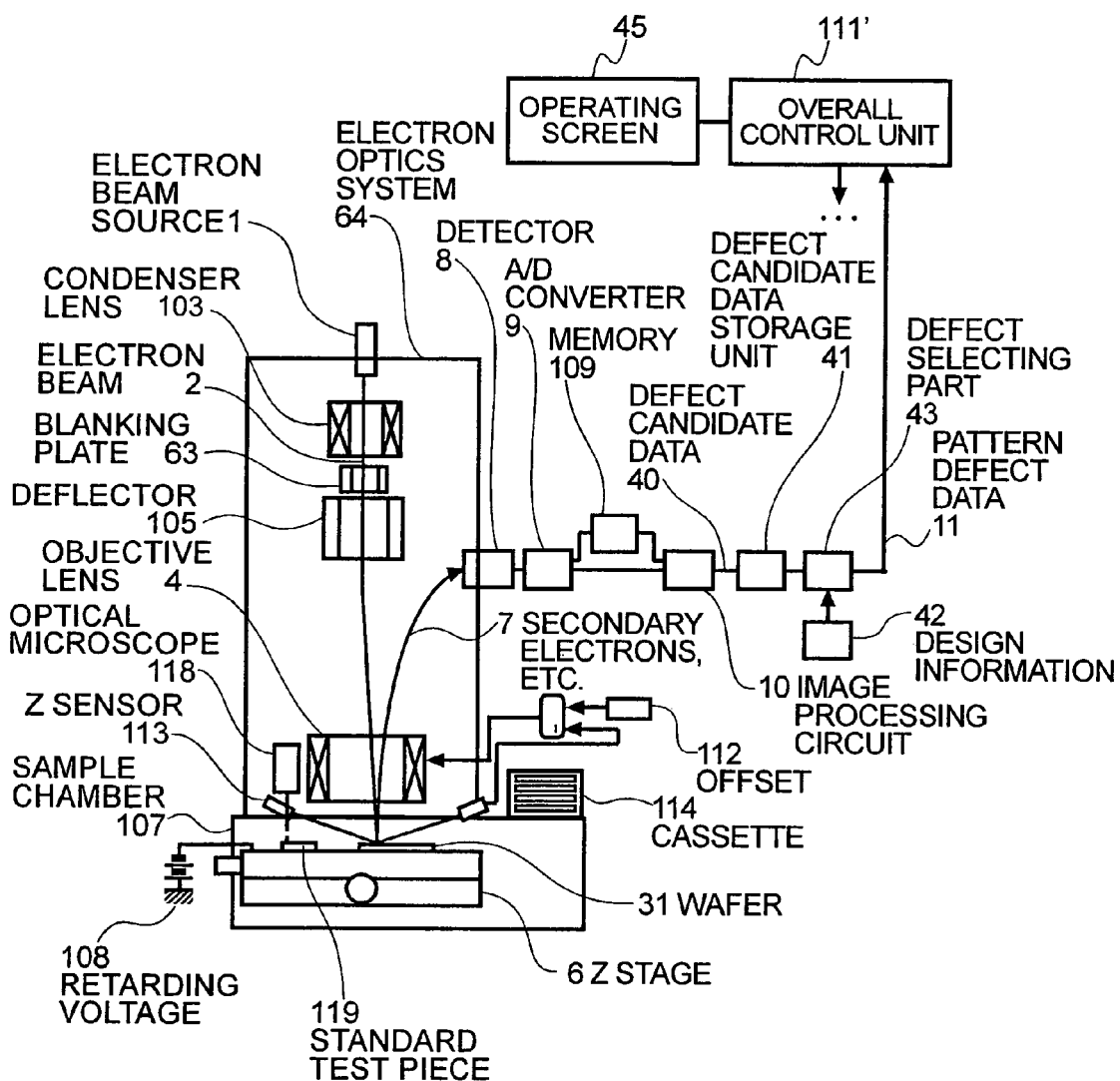
FIG. 20 is a schematic diagram of an electron beam type pattern inspecting apparatus, showing the configuration of a third embodiment of the present invention.

A third embodiment of the present invention will now be described with reference to FIG. 20, which illustrates an embodiment of the configuration of an electron beam type pattern inspecting apparatus according to the present invention. The electron beam type pattern inspecting apparatus is composed of an electron beam source 1 having an electron gun for emitting an electron beam 2, and an electron optical system which extracts the electron beam 2 from the electron beam source 1 while accelerating it and which forms a virtual light source 101 at a certain position using an electrostatic or electromagnetic lens. The electron optical system comprises a condenser lens 103 for converging the electron beam 2 from the virtual light source to a certain position, a blanking plate 63 installed near a position where the electron beam is converged by the electron gun to effect ON/OFF control of the electron beam 2, a deflector 105 for deflecting the electron beam 2 in XY directions, and an objective lens 4 for converging the electron beam 2 onto an object substrate 5. The apparatus further includes a sample chamber 107 for holding a wafer 31 as the object substrate in a vacuum, a Z stage 6 carrying the wafer 31 thereon and to which a retarding voltage 108 is applied which permits image detection at an arbitrary position, and a detector 8 for detecting secondary electrons, etc. generated from the object substrate 5.

An A/D converter 9 for subjecting a detected signal from the detector 8 to A/D conversion to obtain a digital image, and a memory 109 operates to store the digital image. An image processing circuit 10 compares the image stored in the memory 109 with the digital image obtained by A/D conversion and detects a place giving rise to a difference as a defect candidate represented by defect candidate data 40, and a defect candidate data storage unit 41 stores feature quantities of the defect candidate data 40, such as coordinates, projection length, area, critical threshold value DD (a threshold value used as a boundary to detect a smaller value as a defect), difference image mean value, difference image dispersion, maximum image difference, defect image texture, reference image texture, and image information. A defect selecting unit 43 adds information based on design information 42 to the defect candidate data 40 read from the defect candidate data storage unit 41 and outputs pattern defect data 11. An overall control unit 111', which controls the entire apparatus, receives the pattern defect data 11 from the defect selecting unit 43 (a control line from the overall control unit 111' is omitted in the figure) and provides data to a display device having an operating screen 52 for various operations, a keyboard and a mouse and a knob (none of them are shown) for instructing operations.

A Z sensor 113 measures the height of the wafer 31 and keeps constant a focal position of a digital image detected by controlling the current value of the objective lens 4 with offset 112 added thereto.

A loader (not shown) is provided for loading and unloading the wafer 31 present within a cassette 114 with respect to the sample chamber 107, and an orientation flat detector (not shown) positions the wafer 31 on the basis of an external shape of the wafer. An optical microscope 118 is provided for observing a pattern on the wafer 31, and a standard test piece 119 is mounted on the Z stage 6.

The operation of the third embodiment will now be described. The Operation involves a conditioning operation for setting a threshold value on the basis of design information and an inspection in which there is outputted pattern defect information with defect-or-not information in adjusted sensitivity for each area added to the detected defect candidate data 40.

The conditioning operation is performed in the following manner. The initial screen shown in FIG. 7 is displayed on the operating screen 52, a user selects a rack No. on which the wafer 31 of concern rests with use of a rack No. selecting part 130, the type and process of the wafer 31 of concern are designated with use of a recipe selecting part 131 and a recipe preparation start button 132 is operated to start conditioning. The conditioning operation involves contrast setting for setting conditions for the electron optical system, pattern layout setting for the wafer 31, alignment for pattern positioning on the wafer 31, calibration for checking signal quantity at a place where the signal quantity of the wafer 31 is expressed exactly, and image processing condition setting for setting and acknowledging an image processing threshold value. Here, the related contrast setting and image processing condition setting will be described.

When the operation is started, the overall control unit 110 instructs the components to operate in accordance with the following procedure. A command is issued to the loader (not shown), which in turn takes out the wafer 31 from the cassette 114. The position of the wafer 31 is established on the basis of its external shape by means of the orientation flat detector (not shown) and is placed on the Z stage 6. The interior of the sample chamber 107 is made vacuous. After the wafer 31 has been placed on the Z stage 6, conditions are set for both the electron optical system and the retarding voltage 108, and a voltage is applied to the blanking plate 63 to cut OFF the electron beam 2.

The stage is moved to align the standard test piece 119, the Z sensor 113 is made valid, a focal point is kept constant at a detected value of the Z sensor 113 plus the offset 112, the deflector 105 is raster-scanned, the voltage of the blanking plate 63 is cut OFF, the electron beam 2 is radiated onto the wafer only when required, reflected electrons or secondary electrons emitted at this instant from the wafer 31 are detected by the detector 8, and the detected signal is converted into a digital image by the A/D converter 9. Plural digital images are detected by changing the offset 112, and an optimum offset corresponding to the largest intra-image total of image differential values is set as a current offset value in the overall control unit 111' at every detection.

After this setting, the Z sensor 113 is made invalid, and the screen is shifted to the contrast adjusting screen shown in FIG. 8. The contrast adjusting screen is composed of a map display unit 55 provided with a button for controlling a map display method, such as the display of a map and the whole of a wafer or die, and the screen is also provided with a mouse operation instructing button 140 for instructing movement to a selected position or selection of an item thereof on being selected by the mouse, an image display unit 56 provided with an image switching button 141, the image switching button 141 designating a portion to be image-displayed, an image magnification and the type of image, such as an optical microscope image obtained in the optical microscope 118 or an SEM image obtained in the electron optical system, as well as a recipe preparation item selecting button 142, a recipe preparation end button 133, and a recipe preserve button 134. On the contrast adjusting screen, the mouse operation instructing button 140 is set to a movement mode, and the mouse 121 is clicked for movement on the map and the image of the place of concern is displayed on the image display unit. An electron optical system adjusting item is allocated to the knob to adjust various components of the electron optical system and thereby afford an appropriate contrast.

The recipe preparation end button 133, recipe preserve button 134, and the recipe preparation item selecting button 142 instruct the end of recipe preparation, preservation of recipe condition, and setting of another condition and screen transition, respectively. These buttons are common to all screens. By switching the recipe preparation item selecting button 142 to an image processing condition setting screen, a shift to the image processing condition setting screen shown in FIG. 9 is effected.

A trial inspection starting screen is composed of the map display unit 55, recipe preparation end button 133, recipe preserve button 134, recipe preparation item selecting button 142, inspection start button 143, inspection end button 144, and initial threshold setting part 145. The mouse operation selecting button 140 is set to a selection mode. When the user clicks a die in the map display unit, a select/non-select switching is effected for the die to be inspected on a trial basis and the die to be inspected is selected. After selection of the die to be inspected and setting of an initial threshold value th0 (not shown) by the initial threshold setting part 145, the start of trial inspection is instructed by the inspection start button 143.

When the trial inspection is started, the Z stage 6 is moved to a scanning start position of a to-be-inspected area of the wafer 31 carried on the stage. An offset peculiar to the wafer, which is measured in advance, is added to the offset 112 to set an offset value, the Z sensor 113 is made valid, the stage is allowed to scan in the Y direction along the scanning line 33 shown in FIG. 3, the deflector 105 is allowed to scan in the X direction in synchronism with the stage scan, the voltage of the blanking plate 63 is cut OFF during valid scan, and the electron beam 2 is directed to the wafer 31 to scan the wafer. Reflected electrons or secondary electrons generated from the wafer 31 are detected by the detector 8 and the detected signal is subjected to A/D conversion by the A/D converter 9 to obtain a digital image of the stripe area 34, which image is stored in the memory 109. After the scan of the Z stage 6 is over, the Z sensor 113 is made invalid. The whole surface of the required area is inspected by repeating the stage scan. For inspecting the whole surface of the wafer 31, the inspection is performed in accordance with the procedure shown in FIG. 10.

When a detecting position A 35 is being detected by the image processing circuit 10, a comparison is made with the image of a detecting position B 36 stored in the memory 109, and a place giving rise to a difference of not smaller than the initial threshold value th0 is extracted as defect candidate data 40, and feature quantities of the defect candidate data 40 are stored in the defect candidate data storage unit 41, such as coordinates, projection length, area, critical threshold value (a threshold value used as a boundary to detect a smaller value as a defect), difference image mean value, difference image dispersion, maximum image difference, defect image texture, reference image texture, and image information. In the defect selecting unit 43, information as to whether the critical threshold value DD of the defect candidate data 40 is not smaller than an inspection threshold value thl of the N expression or not is added, provided at this, time point thN is one expression and thN=th0, and a list of pattern defects 11 is prepared and is sent to the overall control unit 111'. The overall control unit 111' receives feature quantities of the pattern defect data 11 from the defect selecting unit 43. After the inspection of the required area is over, the defect acknowledging screen shown in FIG. 11 is displayed.

The defect acknowledging screen is made up of a defect display/editing part 150 capable of displaying feature quantities of defects and editing a classification, the map display unit 55 which displays a current position 59 and pattern defect data 11 using a symbol for the display of classification No., together with layout information of wafer 31, the image display unit 56 which displays an image of a current position, a display threshold setting part 152 which sets the range in threshold value (upper-limit threshold thh and lower-limit threshold thl) of the defect displayed, a display switching button 151 displaying only defect candidates in an area which is to be inspected at a high sensitivity on the basis of design information 42 and which has a certain or higher pattern density or is formed of a specific material, an inspecting threshold setting part 153 which sets the upper-limit value thh or lower-limit value thl currently set by the display threshold setting part 152 or an arbitrary threshold value, for each condition of design information, and the other buttons already explained above.

Upper- and lower-limit threshold values thh, thl of the display threshold setting part 152 are set. When the setting of thh and thl is changed, a comparison is made between the critical threshold value DD of each defect candidate and thh, thl and only the defect candidates of thl<DD<thh are displayed on the map display unit 55.

The mouse operation instructing button 140 is set to the selection mode and the pattern defect data 11 is clicked, whereby the image obtained in inspection and stored as the image information of concern, or an image obtained by re-movement to the place of a defect, is displayed in the image display unit 56 and feature quantities are displayed in the defect display/editing part 150. The pattern defect data 11 is classified on the basis of the image and the feature quantities, and the classification No. is added to the feature quantities of the pattern defect data 11 by the defect display/editing part 150. With the classification added, the classification can be distinguished as a difference in display graphic or in display color in the map display unit 55.

With reference to the added classification displayed in the map display unit 55, the user judges and selects an inspecting threshold value thl (not shown) for each condition of design information. Then, in the inspecting threshold setting part 153, the selected inspecting threshold value is set to a current inspecting threshold value thl for each condition of design information. After the setting is over, the initial threshold value th0 set by the recipe preserve button and the inspecting threshold value thl for each condition of design information are preserved in recipe. With operation of the inspection end button, a return is made to the initial screen in trial inspection. A defect candidate detected as the defect candidate data 40 has a difference of not smaller than the initial threshold value th0. It is therefore necessary that the threshold value th0 set by the display threshold setting part 152 and the inspecting threshold setting part 153 will be larger than th0. A required value can be set if th0 is set sufficiently small.

After the end of preservation, a return is made to the defect acknowledging screen in trial inspection by operation of an end button. Further, with operation of the inspection end button 144 on the defect acknowledging screen, a return is made to the initial screen in trial inspection. It is also possible to again set an inspection die in trial inspection and carry out a trial inspection. At the end of acknowledgment, the recipe end button 133 is pushed to terminate the preparation of recipe, whereupon the wafer 31 is unloaded and is returned to the original cassette 114.

A description will now be given of inspection. Inspection is started through the steps of displaying the start screen shown in FIG. 7 on the operating screen 52, selecting a rack No. with the wafer 31 resting thereon by the user through the rack No. selecting part 130, designating the type and process of wafer 31 by the recipe selecting part 131, and pushing the inspection start button 330. The inspection involves the steps of loading, alignment and calibration of the wafer, subsequent inspection, defect check, defect output, and subsequent unloading of the wafer to terminate the inspection. Reference will be made below to the inspection and defect check which are associated with the present invention.

The start of inspection is instructed with operation of the inspection start button 330. When inspection is started, the Z stage 6 is moved to a scan start position of a to-be-inspected area of the wafer 31 carried on the stage. An offset peculiar to the wafer, which is measured in advance, is added to the offset 112 to set an offset value, the Z sensor 113 is made valid, the Z stage 6 is allowed to scan in the Y direction along the scanning line 33 shown in FIG. 3, the deflector 105 is allowed to scan in the X direction in synchronism with the stage scan, the voltage of the blanking plate 63 is cut OFF during valid inspection, and the electron beam 2 is applied to the wafer 31 to scan the wafer. Reflected or secondary electrons from the wafer 31 are detected by the detector 8 and the detected signal is subjected to A/D conversion in the A/D converter 9 to produce a digital image of the stripe area 34, which image is stored in the memory 109. After the scan of the Z stage 6 is over, the Z sensor 113 is made invalid. The whole surface of the required area is inspected by repeating the stage scan. For inspecting the whole surface of the wafer 31, the inspection is performed in accordance with the procedure shown in FIG. 10.

When a detecting position A 35 is being detected by the image processing circuit 10, a comparison is made with the image of a detecting position B 36 stored in the memory 109, and a place giving rise to a difference of not smaller than the initial threshold value th0 is extracted as a defect candidate data 40. Then, a list of pattern defects 11 is prepared in the defect selecting unit 143 while adding thereto information as to whether the critical threshold value DD of the defect candidate is not smaller than the inspecting threshold value thl which has been set for each condition of design information, and it is sent to the overall control unit 111'. The overall control unit 111' receives feature quantities of the pattern defects 11 from the defect candidate data storage unit 41. After the inspection of the required area is over, the defect acknowledging screen shown in FIG. 12 is displayed.

The defect acknowledging screen is made up of the defect display/editing part 150 capable of displaying feature quantities of defects and editing a classification, the map display unit 55 which displays a current position 59 and pattern defect data 11 using a symbol for the display of a classification No., together with layout information of the wafer 31, the image display unit 56 which displays an image of the current position, the display switching button 151 for displaying only defect candidates of an area which is to be inspected at a high sensitivity on the basis of design information 42 and which has a certain or higher pattern density or is formed of a specific material, and the inspection end button 144 for instructing the end of inspection.

The mouse operation instructing button 140 is set to a selection mode and the pattern defect data 11 is clicked, whereby an image is displayed in the image display unit 56, and feature quantities thereof are displayed in the defect display/editing part 150. The pattern defect data 11 is classified on the basis of the image and feature quantities, and the classification No. is imparted to the feature quantities of the pattern defect data 11 by the defect display/editing part 150. The inspecting threshold value thl is switched by operation of the display switching button 151 which displays only defect candidates of a specific area on the basis of design information 42, whereby with the inspecting threshold value thl of the specific area, it is possible to display only defect candidates that become defects in that area. It is also possible to display defect candidates falling under the range of thl and thh which has been set in the display threshold setting part 152. The defect check is terminated with operation of the inspection end button, and after the output of a result, a return is made to the initial screen.

According to this embodiment, it is possible to obtain inspection results in different image processing conditions of a specific area on the basis of design information 42. Besides, if the threshold value is found to be improper after the inspection, it is possible to correct the threshold value before acknowledgment. Moreover, the image obtained in inspection can be used in a threshold setting and result check, so that a defect/non-defect judgment can be made on the basis of the image obtained when the electron beam was first applied to the object to be inspected. Further, since a threshold setting and result check can be carried out while switching over between the image obtained in inspection and a re-detected image, the defect/non-defect decision can be made more accurately. Since a defect candidate is extracted using an initial threshold value and information thereof is held, it is possible to meet the demand for obtaining a result in inspection performed under a higher sensitivity condition than the inspecting threshold value. Further, since image information is included in the defect list, as to a defect whose importance could not be recognized at the time of a defect check, an image thereof obtained in inspection can be checked later.

In a first modification of this third embodiment, instead of the operator setting the initial threshold value th0, an automatic setting is effected to a minimum threshold value required, which is determined by the noise of the apparatus itself and a statistical fluctuation. It is also possible to present this automatically set value to the operator first.

According to this modification there is no fear of setting a threshold value of high sensitivity that may result in detection of a large amount of defect candidates, not true defects, meaninglessly.

In a second modification of this third embodiment, instead of the critical threshold value DD being calculated in the image processing circuit 10, it is calculated in the defect selecting unit 43 from feature quantities of the defect candidate data 40, such as coordinates, projection length, area, difference image mean value, difference image dispersion, maximum image difference, defect image texture, reference image texture, and image information. If an image difference which ranks $N^{th}$ in the degree of difference is used as a feature quantity, and if a place of a large difference above a certain area is defined to be a defect, it is possible to calculate the critical threshold value DD. Moreover, if image information (two images taken out mainly from a defect portion and a reference image) is used as a feature quantity, the critical threshold value can be calculated by making a defect judgment in the defect selecting unit again from the two images.

According to this modification, a conventional image processing circuit can be used, as it is, as the image processing circuit 10, and if the defect selecting unit 43 is constituted by software, a much reduced number of developing steps suffices.

According to the present invention, by a single inspection of the object substrate, it is possible to simultaneously obtain the results of image processing conditions, including, for example, threshold values of N expressions.

According to the present invention, the inspection sensitivity can be, changed on the basis of design information or feature quantities, including image information obtained in inspection and according to pattern density and pattern shape and material.

Further, according to the present invention, by changing the inspection sensitivity on the basis of design information or feature quantities, including image information obtained in inspection and according to pattern density and material, it is possible to keep the inspection sensitivity or the critical defect detecting sensitivity constant.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. A pattern inspecting method comprising the steps of:
   picking up an image of a substrate with a pattern formed thereon;
   subjecting a signal obtained by the image pick-up to A/D conversion to afford a digital image;
   comparing the digital image with a stored reference image to produce a difference image between the digital image and the reference image;
   subjecting the difference image to a first threshold to extract first defect candidates;
   storing images of the extracted first defect candidates together with information on feature quantities of the images of the first defect candidates;
   subjecting the stored images of the first defect candidates and the stored information of feature quantities of the images of the first defect candidates to a second threshold that is higher than the first threshold;
   extracting second defect candidates from among the first defect candidates based on the second threshold applied in the step of subjecting the stored images; and
   displaying on a screen a state of distribution of the extracted second defect candidates on the substrate.

2. A pattern inspecting method according to claim 1, wherein the image pick-up for the substrate is performed by irradiating the substrate with light or charged particles and detecting any of secondary electrons, reflected electrons, transmitted electrons, and absorbed electrons, which result from the irradiation.

3. A pattern inspecting method according to claim 1, wherein images of the extracted second defect candidates and Information on feature quantities of the second defect candidates are also displayed in the displaying step.

4. A pattern inspecting method according to claim 3, wherein the information on feature quantities includes at least one of coordinates, projection length, area, critical threshold value (a threshold value used as a boundary to detect a smaller value as a defect), difference image mean value, difference image dispersion, maximum image difference, defect image texture, reference image texture, and image information.

5. A pattern inspecting method according to claim 4, wherein, in the displaying step, the state of distribution of the extracted second defect candidates on the substrate is displayed while being classified in terms of the feature quantities of the second defect candidates.

6. The pattern inspecting method according to claim 1, wherein the step of displaying is performed prior to classifying second defect candidates into one or more classifications.

7. The pattern inspecting method according to claim 1, further comprising a step of classifying the second defect candidates into one or more classifications.

8. A pattern inspecting method comprising the steps of:
picking up an image of a substrate with a pattern formed thereon;
subjecting a signal obtained by the image pick-up to A/D conversion to afford a digital signal;
comparing the digital image with a stored reference image in a first inspection condition to detect first defect candidates;
storing images of the detected first defect candidates together with information on feature quantities of the images of the first defect candidates;
setting an inspecting threshold value for deciding a defect in a condition different from the first condition from among the stored first defect candidates;
extracting second defect candidates from among the stored first defect candidates with use of the set inspecting threshold value; and
displaying on a screen a state of distribution of the extracted second defect candidates on the substrate.

9. A pattern inspecting method according to claim 8, wherein, in the inspecting threshold value setting step, the inspecting threshold value is set on the screen.

10. A pattern inspecting method according to claim 8, wherein images of the extracted second defect candidates and information on feature quantities of the second defect candidates are also displayed in the displaying step.

11. A pattern inspecting method according to claim 10, wherein the information on feature quantities includes at least one of coordinates, projection length, area, critical threshold value (a threshold value used as a boundary to detect a smaller value as a defect), difference image mean value, difference image dispersion, maximum image difference, defect image texture, reference image texture, and image information.

12. A pattern inspecting method according to claim 11, wherein, in the displaying step, the state of distribution of the extracted second defect candidates on the substrate is displayed while being classified in terms of the feature quantities of the second defect candidates.

13. A pattern inspecting method comprising the steps of:
picking up an image of a substrate with a pattern formed thereon to afford an image of the pattern;
inspecting the pattern image based on a first sensitivity condition to extract first defect candidates;
storing images of the extracted first defect candidates;
extracting images of second defect candidates from among the stored images of the first defect candidates based on a second sensitivity condition that is lower than the first sensitivity condition; and
displaying on a screen a state of distribution of the extracted second defect candidates on the substrate.

14. A pattern inspecting method according to claim 13, wherein, in the displaying step on the screen, the extracted second defect candidates are displayed while being classified in terms of feature quantities of the second candidates.

15. A pattern inspecting method according to claim 14, wherein the feature quantities of the second defect candidates include at least one of coordinates, projection length, area, critical threshold value (a threshold value used as a boundary to detect a smaller value as a defect), difference image mean value, difference image dispersion, maximum image difference, defect image texture, reference image texture, and image information.

16. A pattern inspecting method according to claim 13, wherein, in the displaying step on the screen, the state of distribution of the second defect candidates on the substrate is changed and displayed according to a condition for extracting the images of the second defect candidates.

17. A pattern inspecting method according to claim 13, wherein design information of the pattern is used in extracting the second defect candidates.

18. A pattern inspecting method comprising the steps of:
picking up an image of a substrate with a pattern formed thereon to afford an image of the pattern;
inspecting the pattern image based on a first sensitivity condition to extract first defect candidates;
storing images of the extracted first defect candidates in a storage means through a communication means;
applying a second sensitivity condition that is lower than the first sensitivity condition to the stored images of the first defect candidates;
extracting images of second defect candidates from among the stored images of the first defect candidates based on the second sensitivity condition; and
displaying on a screen a state of distribution of the extracted second defect candidates on the substrate while classifying it by features of the second defect candidates.

19. A pattern inspecting method according to claim 18, further including a step of obtaining a detailed image of any of the second defect candidates displayed on the screen.

20. A pattern inspecting method according to claim 19, wherein the second defect candidate for which the detailed image is to be obtained is designated on the screen.

21. A pattern inspecting apparatus comprising:
an image pick-up means for picking up an image of a substrate with a pattern formed thereon;
a circuit means for subjecting a signal resulting from the image pick-up by the image pick-up means to A/D conversion to afford a digital image:
a storage means for storing a reference image;
a defect candidate detecting means which compares the digital image obtained by the circuit means with the reference image stored in the storage means to detect first defect candidates based on a first sensitivity condition;
an image storage means which stores images of the first defect candidates detected by the defect candidate detecting means together with information on feature quantities of the images of the first defect candidates;
a defect candidate extracting means which extracts second defect candidates from among the first defect candidates with use of the images of the first defect candidates and the information on the feature quantities of the first defect candidates both stored in the image storage means by applying a second sensitivity condition that is lower than the first sensitivity condition; and a display means for displaying on a screen a state of distribution on the substrate of the second defect candidates extracted by the defect candidate extracting means.

22. A pattern inspecting apparatus according to claim 21, wherein the image pick-up means is provided with a light irradiating unit for irradiating the substrate with light and a detector unit for detecting an optical image of the substrate irradiated with light by the light irradiating unit.

23. A pattern inspecting apparatus according to claim 21, wherein the image pick-up means is provided with a charged particles irradiating unit for irradiating the substrate with charged particles and a detector unit for detecting any of secondary electrons, reflected electrons, transmitted electrons, and absorbed electrons, which are generated from the substrate by the charged particles irradiated from the charged particles irradiating unit.

24. A pattern inspecting apparatus according to claim 21, wherein the display means further displays images of the second defect candidates extracted by the defect candidate extracting means and information on feature quantities of the second defect candidates.

25. A pattern inspecting apparatus according to claim 24, wherein the information on feature quantities displayed by the display means includes at least one of coordinates, projection length, area, critical threshold value (a threshold value used as a boundary to detect a smaller value as a defect), difference image mean value, difference image dispersion, maximum image difference, defect image texture, reference image texture, and image information.

26. A pattern inspecting apparatus according to claim 25, wherein the display means displays a state of distribution on the substrate of the second defect candidates extracted by the defect candidate extracting means while classifying it by the feature quantities of the second defect candidates.

* * * * *